Feb. 28, 1933.    F. J. HARDMAN ET AL    1,899,325
COMMUTATOR ASSEMBLING MACHINE
Filed Sept. 26, 1931    20 Sheets-Sheet 2

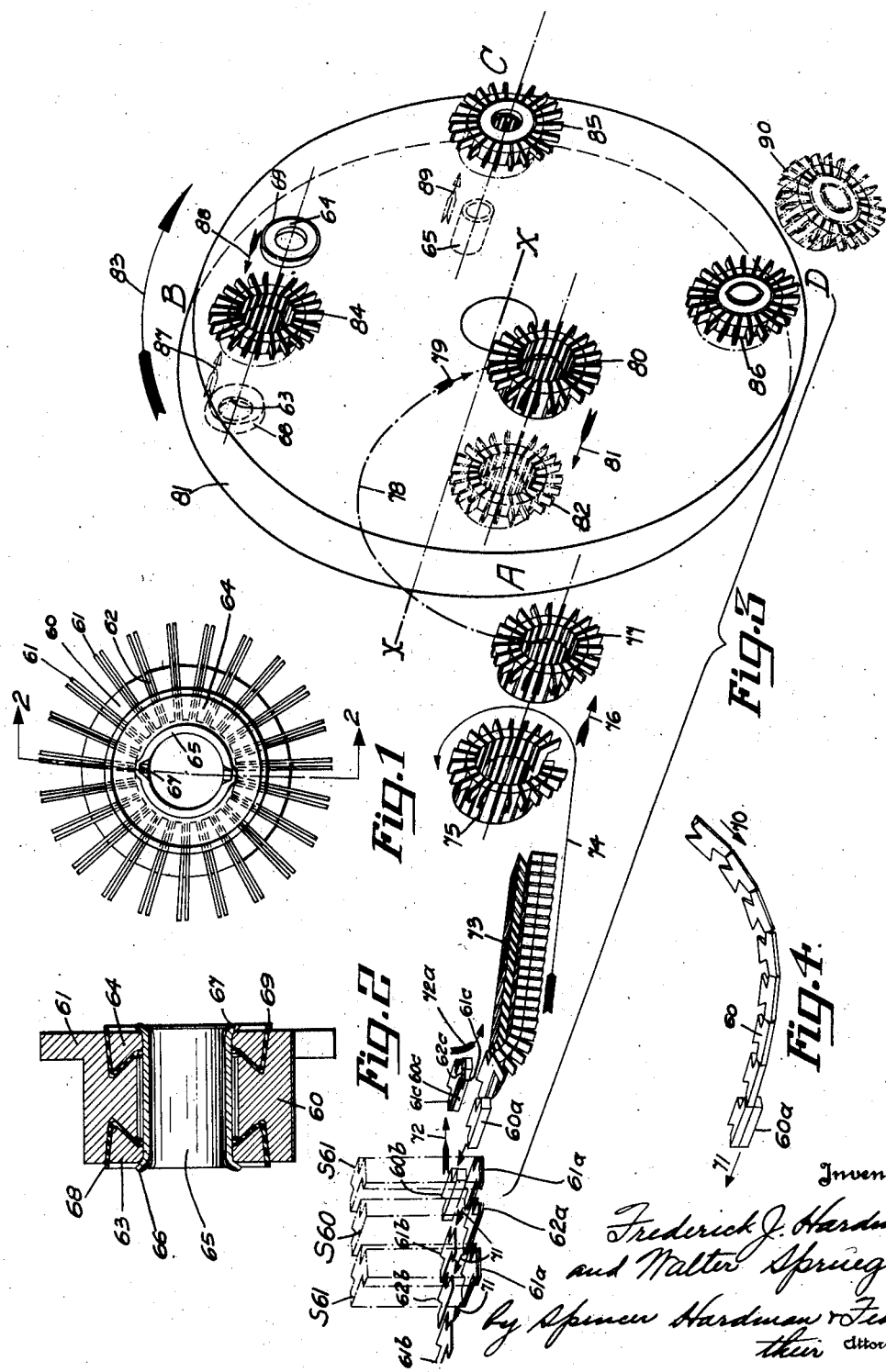

Feb. 28, 1933.　　F. J. HARDMAN ET AL　　1,899,325
COMMUTATOR ASSEMBLING MACHINE
Filed Sept. 25, 1931　　20 Sheets-Sheet 6

Inventors
Frederick J. Hardman
and Walter Spruegel
By Spencer Hardman & Fehr
their Attorneys

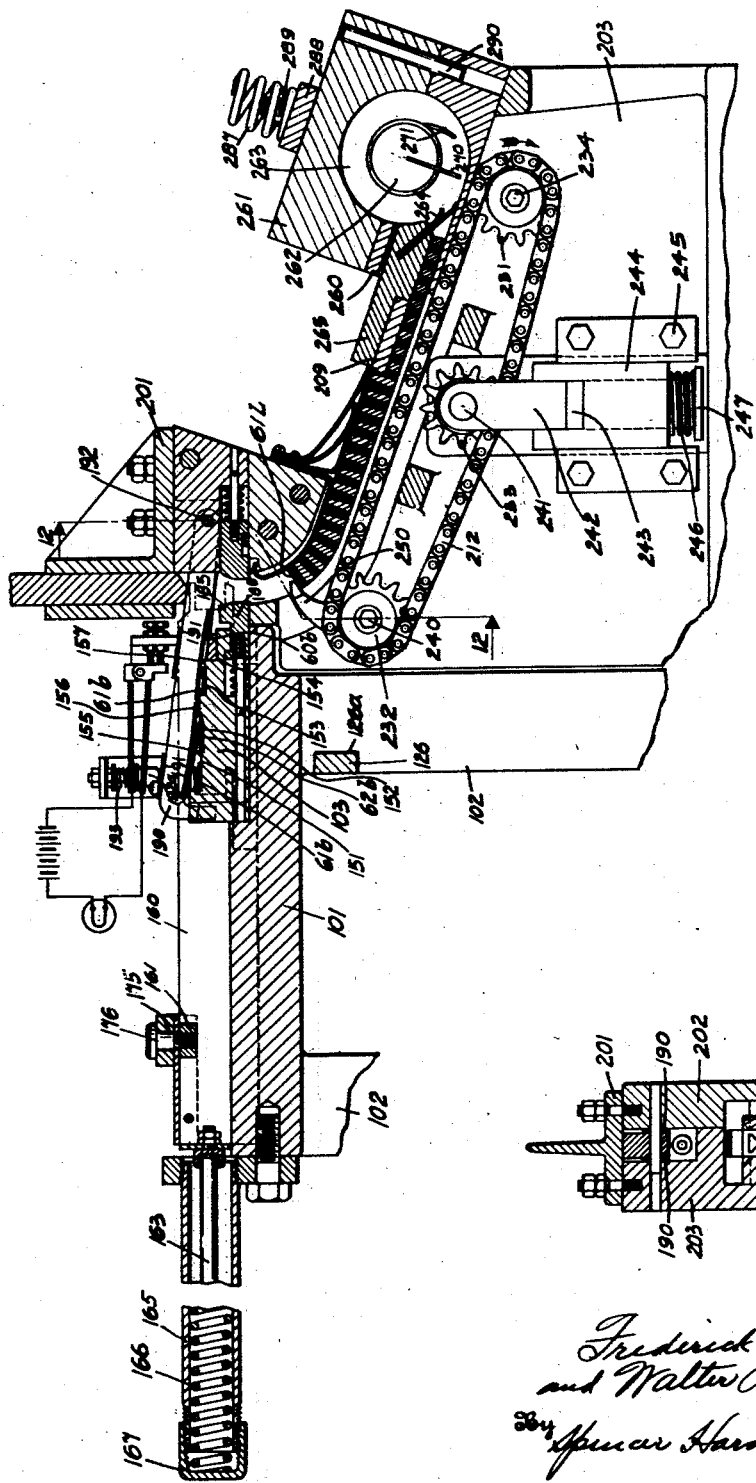

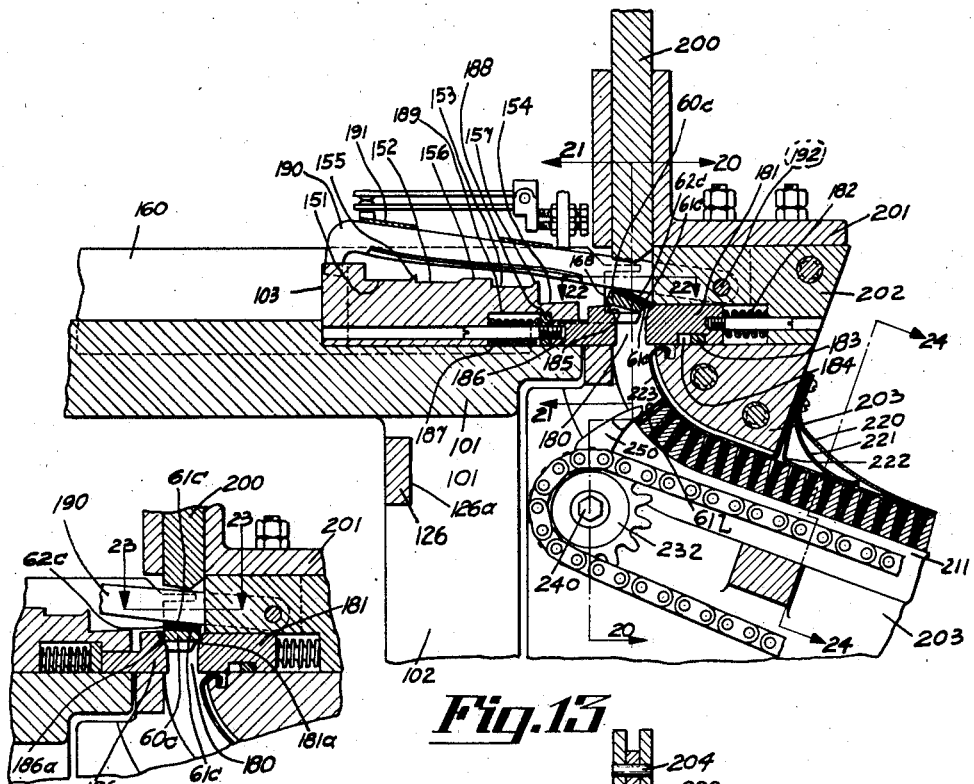
Fig.13
Fig.14
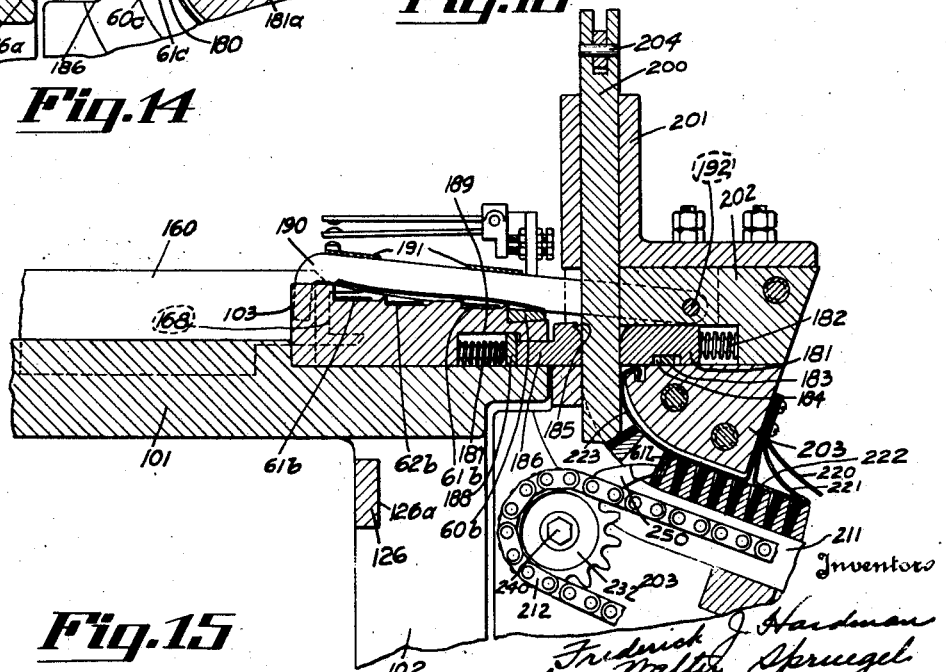
Fig.15

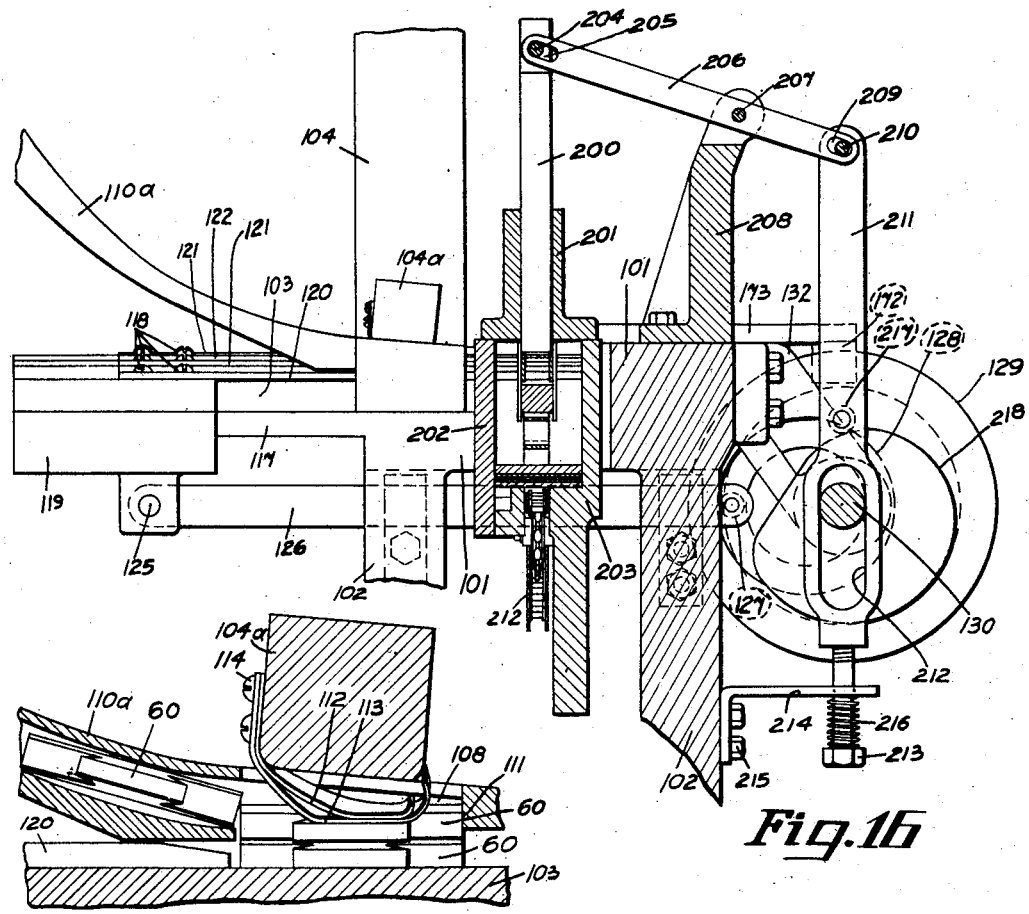
Fig.16
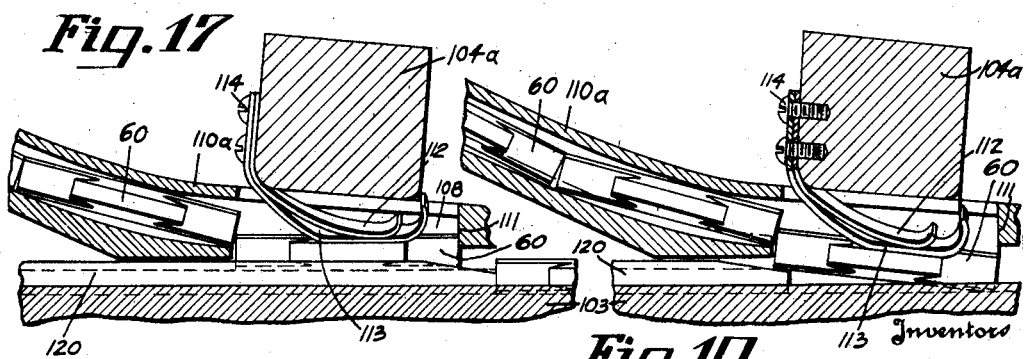
Fig.17
Fig.18
Fig.19

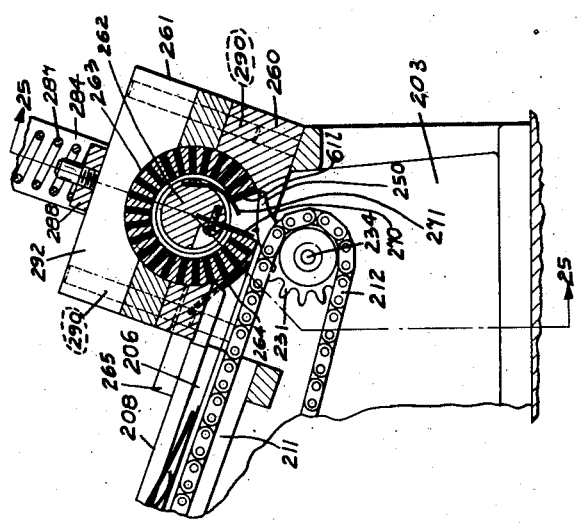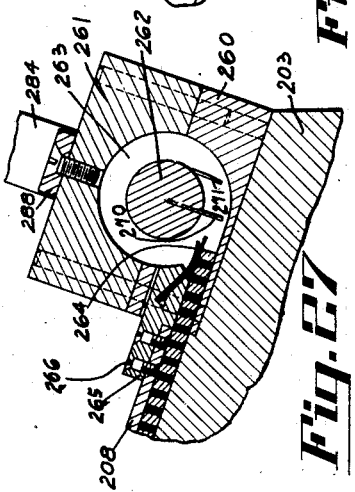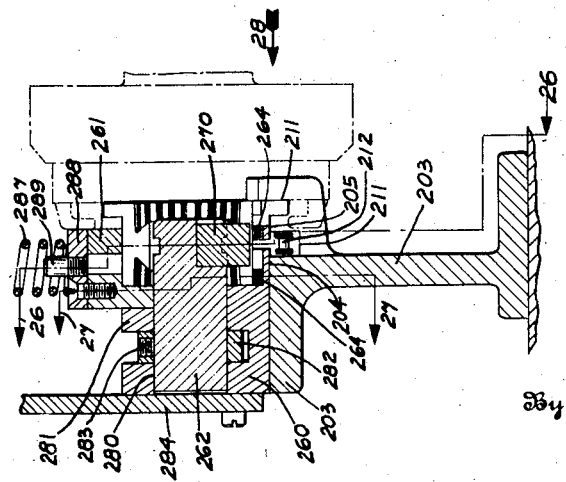

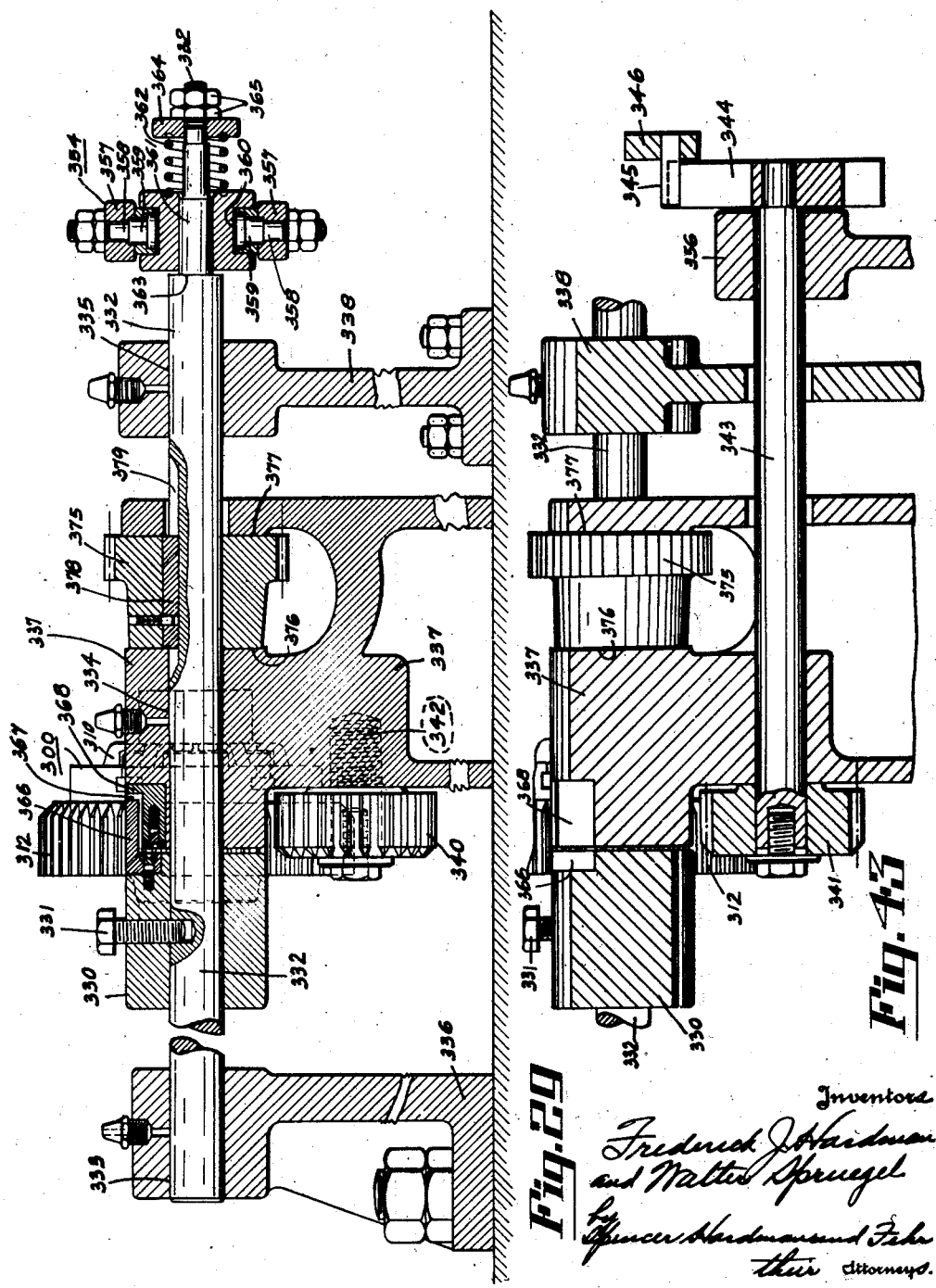

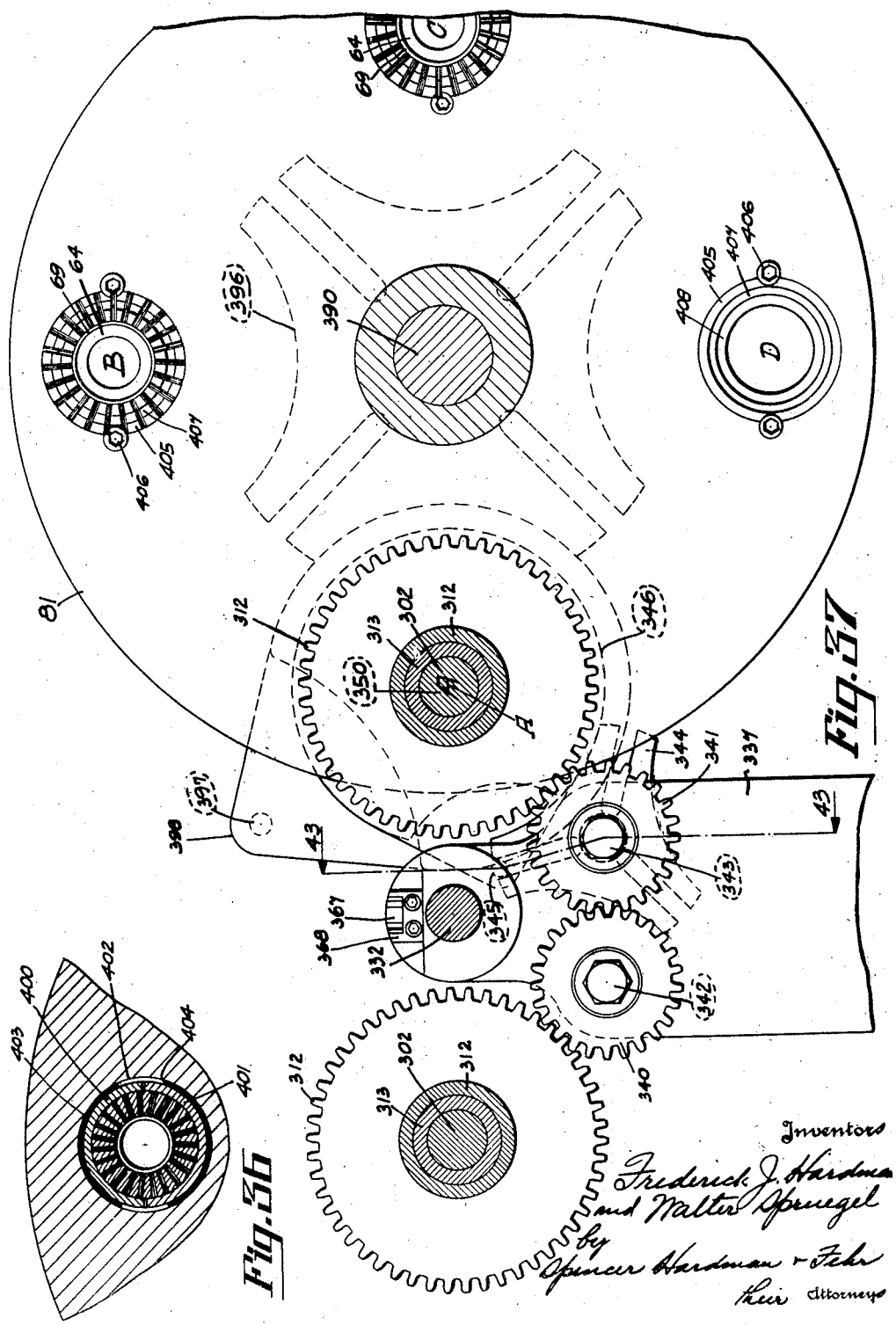

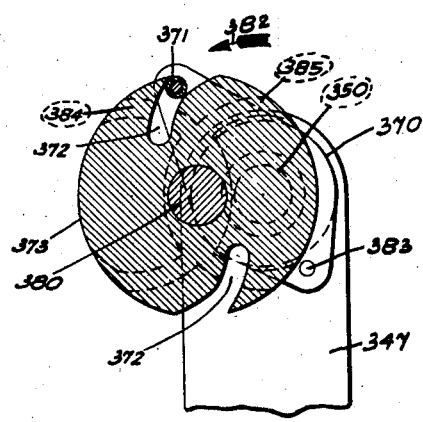
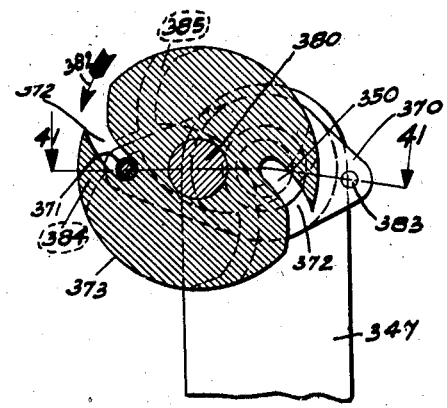
Fig.38  Fig.39
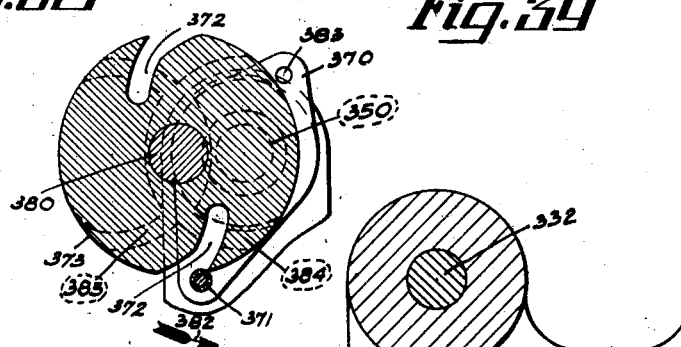
Fig.40
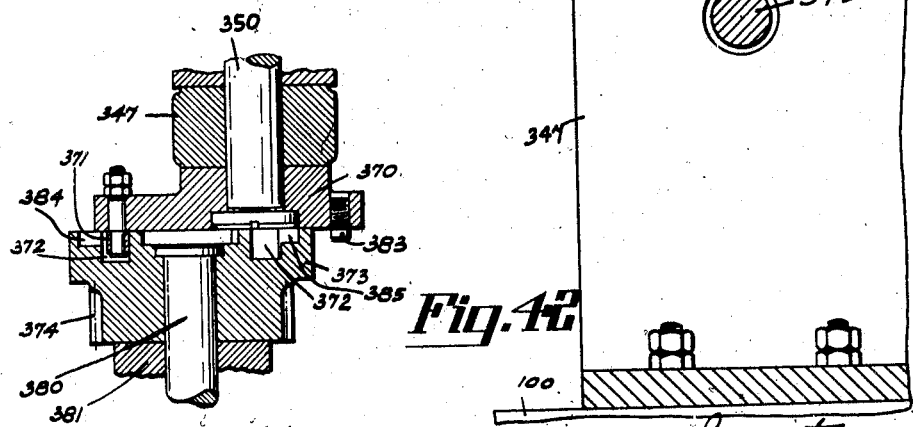
Fig.41  Fig.42

Feb. 28, 1933.   F. J. HARDMAN ET AL   1,899,325
COMMUTATOR ASSEMBLING MACHINE
Filed Sept. 26, 1931   20 Sheets-Sheet 16
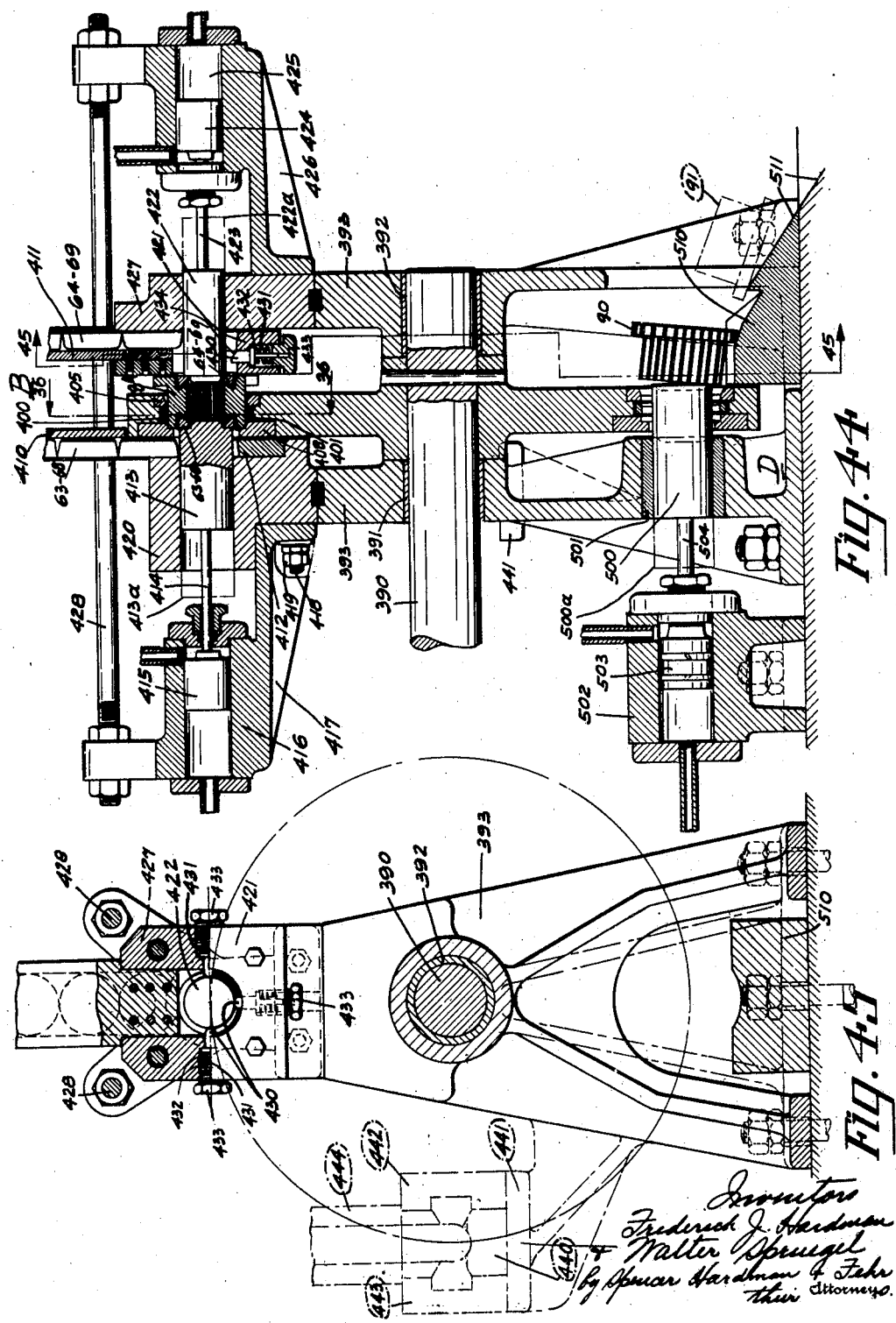

Feb. 28, 1933.　　F. J. HARDMAN ET AL　　1,899,325
COMMUTATOR ASSEMBLING MACHINE
Filed Sept. 26, 1931　　20 Sheets-Sheet 17
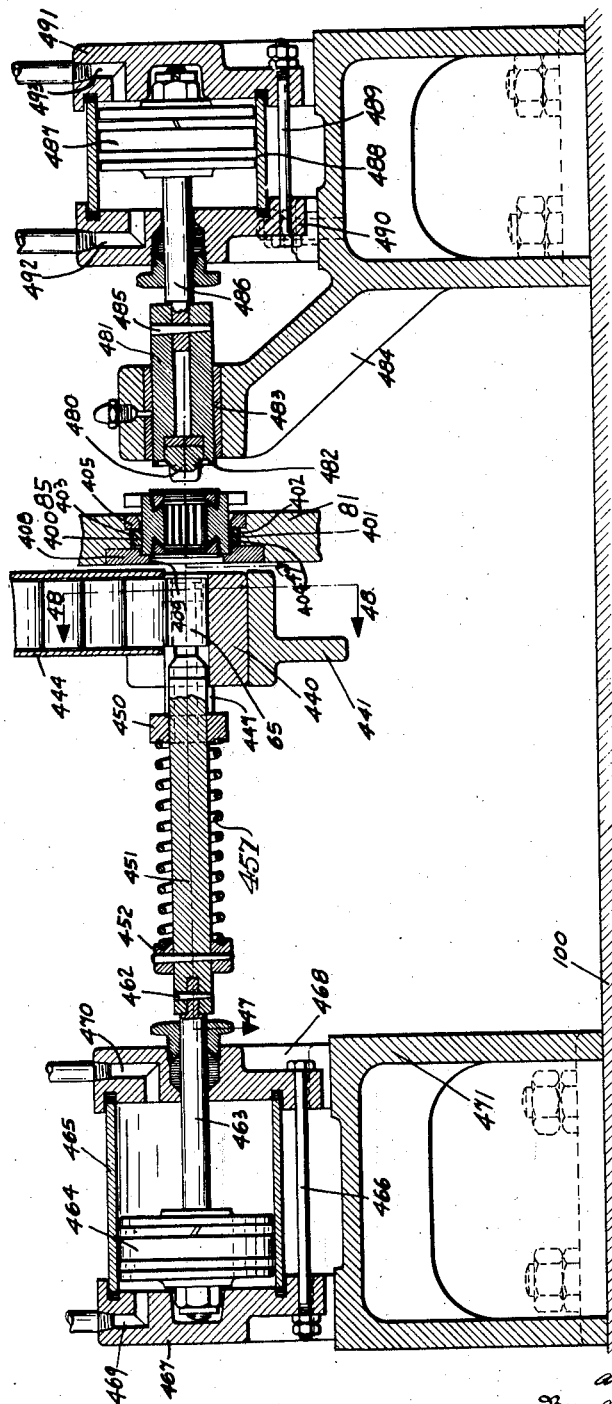
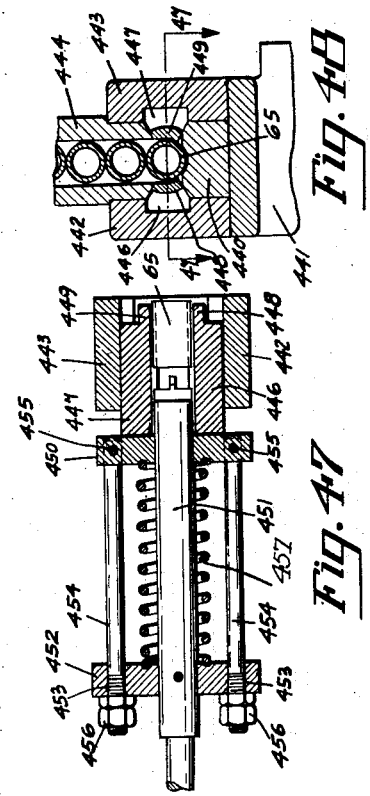
Inventors
Frederick J. Hardman
and Walter Spruegel
By Spencer Hardman & Fehr
their Attorneys Feb. 28, 1933.  F. J. HARDMAN ET AL  1,899,325
COMMUTATOR ASSEMBLING MACHINE
Filed Sept. 26, 1931   20 Sheets-Sheet 18
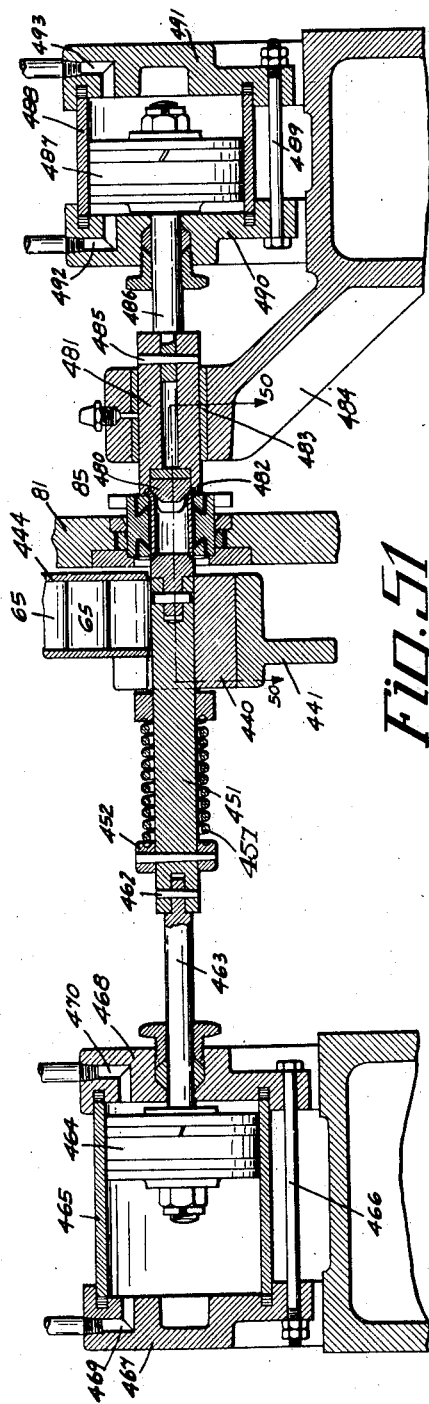
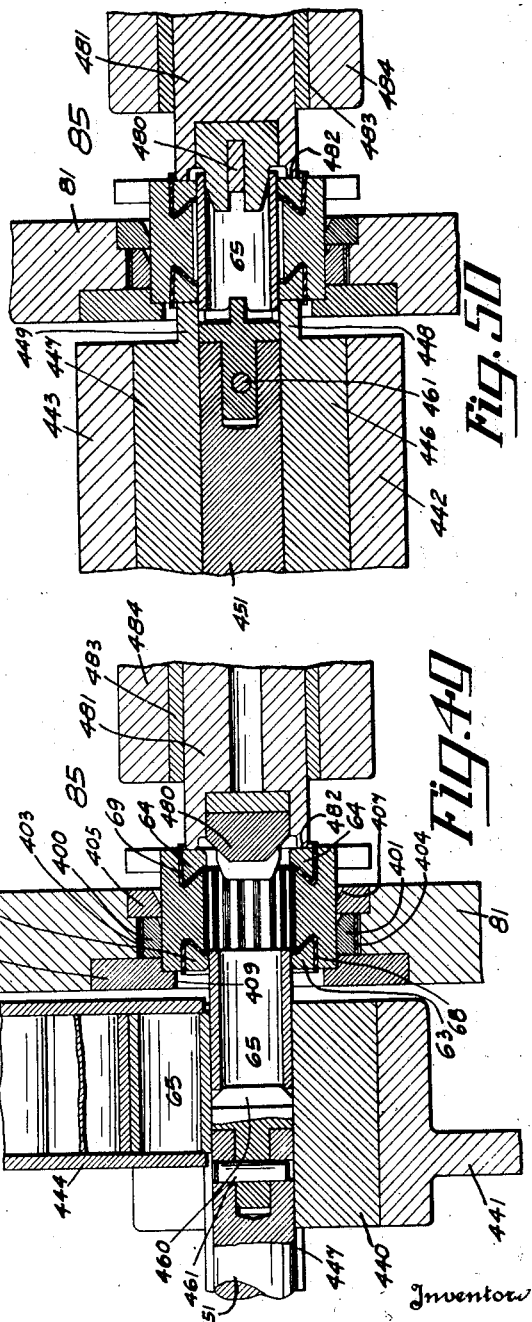

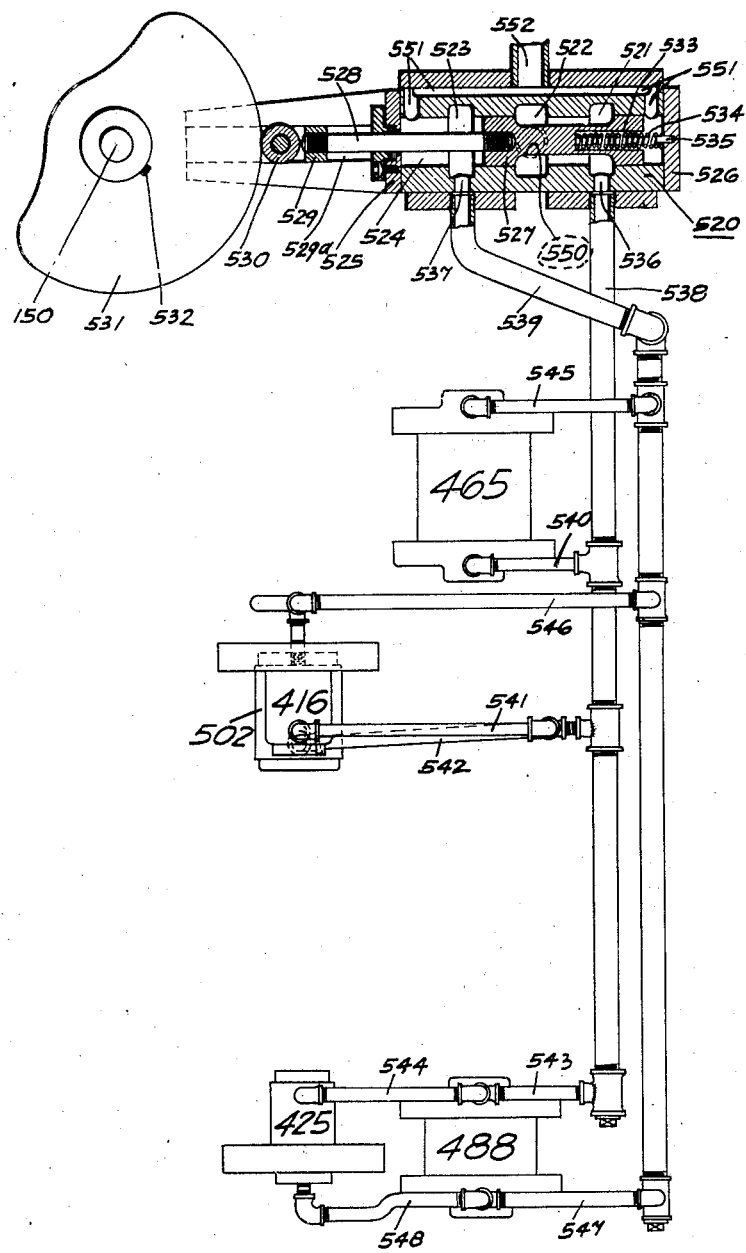

Patented Feb. 28, 1933

1,899,325

UNITED STATES PATENT OFFICE

FREDERICK J. HARDMAN AND WALTER SPRUEGEL, OF DAYTON, OHIO, ASSIGNORS TO DELCO-REMY CORPORATION, OF ANDERSON, INDIANA, A CORPORATION OF DELAWARE

COMMUTATOR ASSEMBLING MACHINE

Application filed September 26, 1931. Serial No. 565,304.

This invention relates to the manufacture of commutators for dynamo electric machines, and is an improvement over the apparatus disclosed in the copending application Serial No. 576,494, filed November 21, 1931. In this copending application claims are presented to structure common to the disclosures of both applications, which common structure, however, forms no part of the present invention and is therefore not claimed herein. More particularly this invention is directed to the manufacture of commutators comprising an annulus or annular row of commutator segments which are keystone-shaped in cross section, flat sheet metal riser bar segments, one located on each side of the keystone-shaped commutator segments, and insulating segments of sheet fiber or mica, separating adjacent riser bar segments. All these segments are provided with dovetail shaped tangs, projecting inwardly and radially with respect to the axis of the commutator. This annulus of segments is secured together by clamping rings, one located adjacent each side of the annulus and adapted to bear against the side edges of the tangs of the segments. The clamping rings are insulated from the segment by insulating rings which are substantially V-shaped in cross section. The V insulating rings and the clamping rings are secured in position against the side edges of the tangs of the segments by a metallic tubular core passing through the center of the annulus and having its end portions formed against the outer face of the clamping rings while these rings are being forced against the segments to hold them in assembled relation.

The chief aim and object of this invention is to provide for automatically assembling a commutator of the type referred to and this aim is carried out by providing a machine into which all of the various parts of the commutator are fed and from which commutators are delivered in completed form without requiring manipulation whatever by an operator except to start and stop the machine as will be described.

Further objects and advantages of the present invention will be apparent from the following description, reference being had to the accompanying drawings wherein a preferred embodiment of one form of the present invention is clearly shown.

In the drawings:

Fig. 1 is an end view of a commutator which can be automatically constructed by the machine in mounting the present invention;

Fig. 2 is a sectional view on the line 2—2 of Fig. 1;

Figure 5:
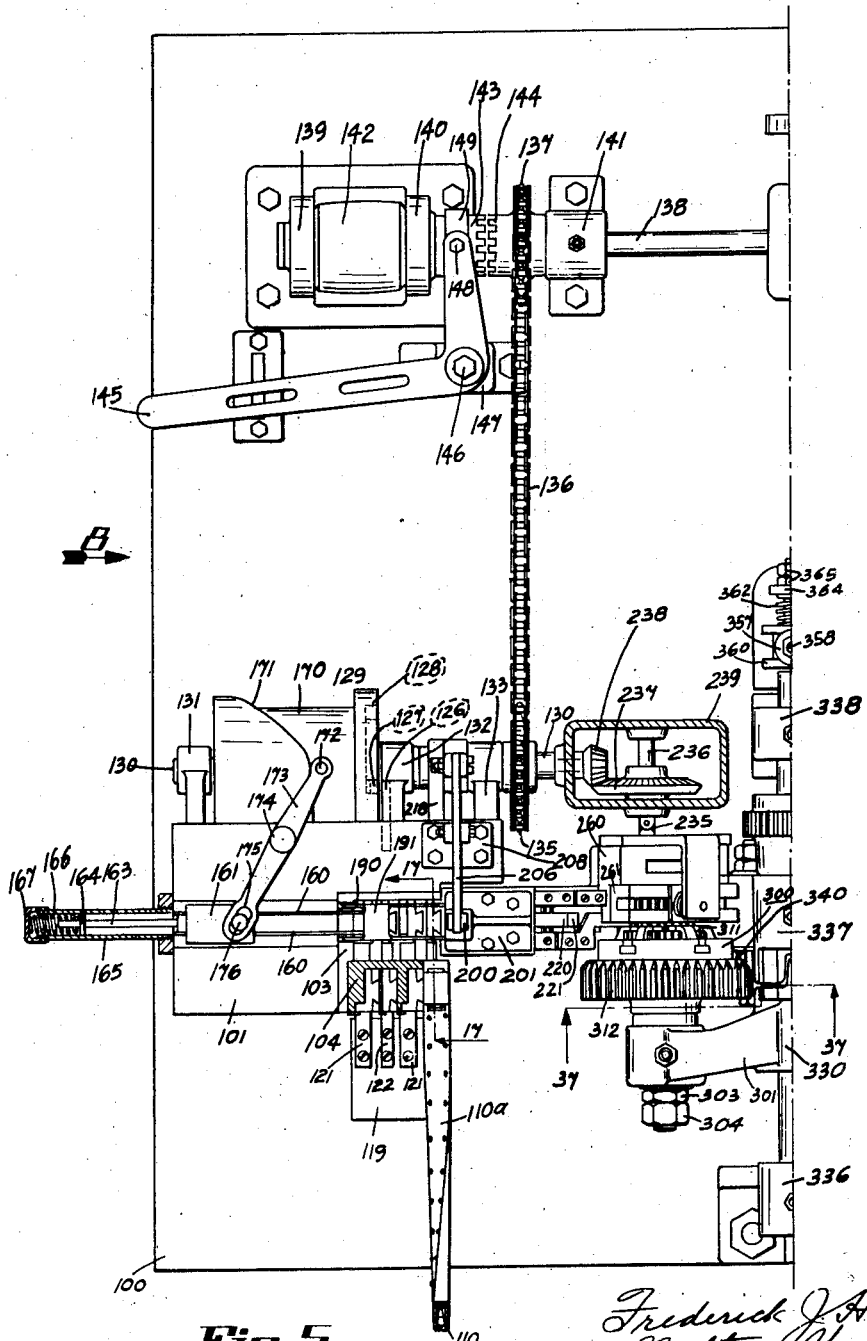
Figure 6:
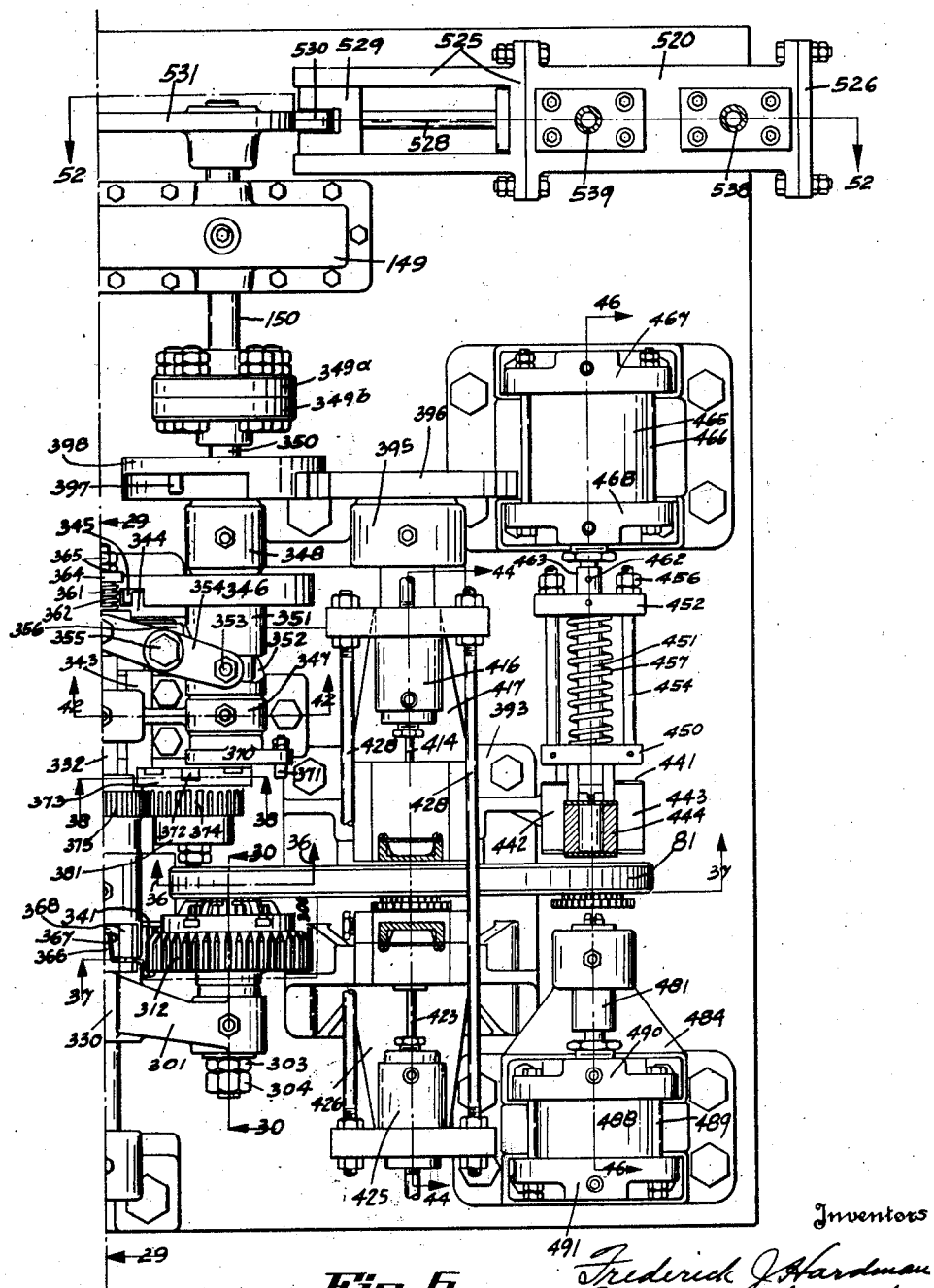
Figure 7:
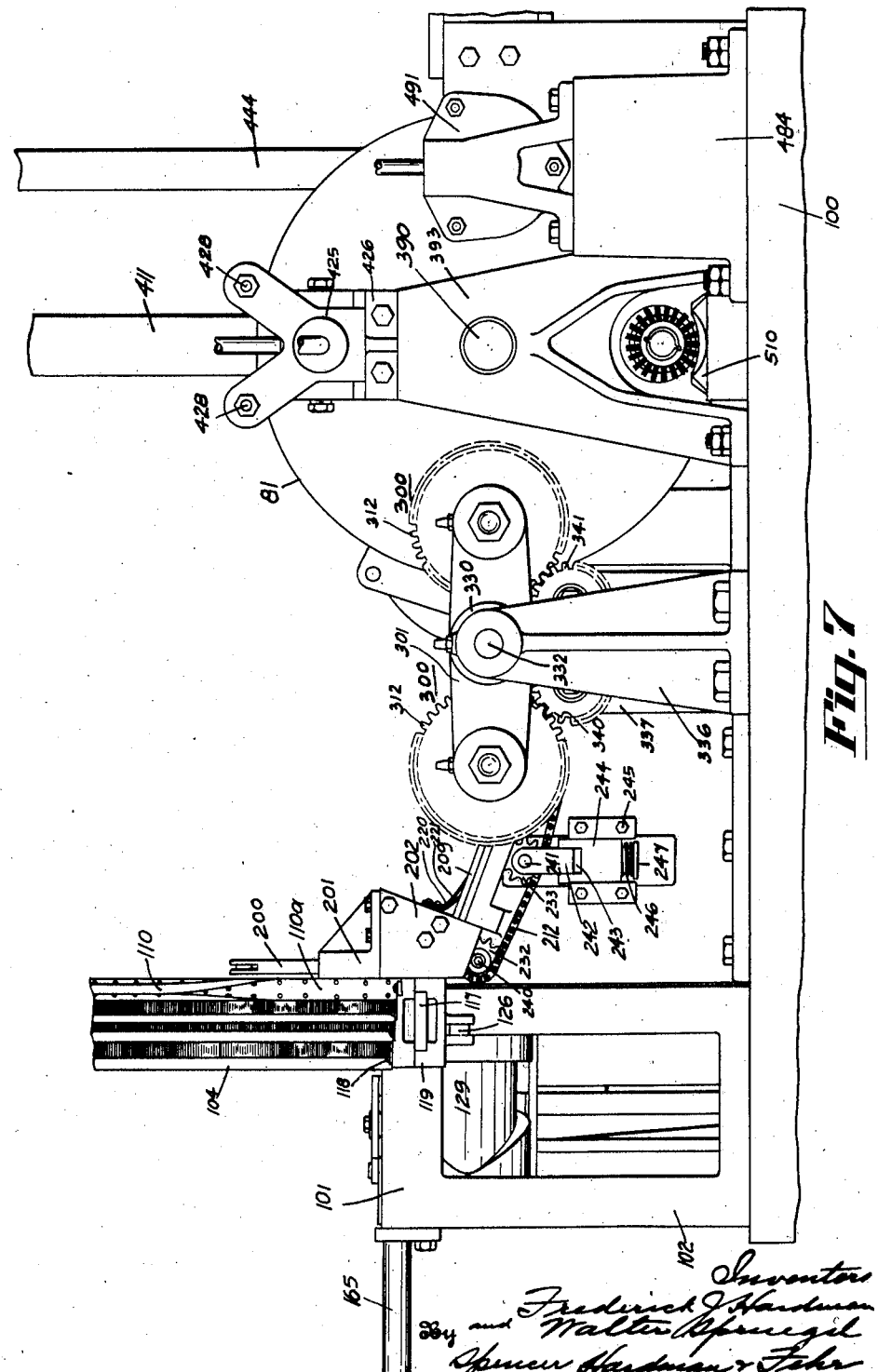
Figure 8:
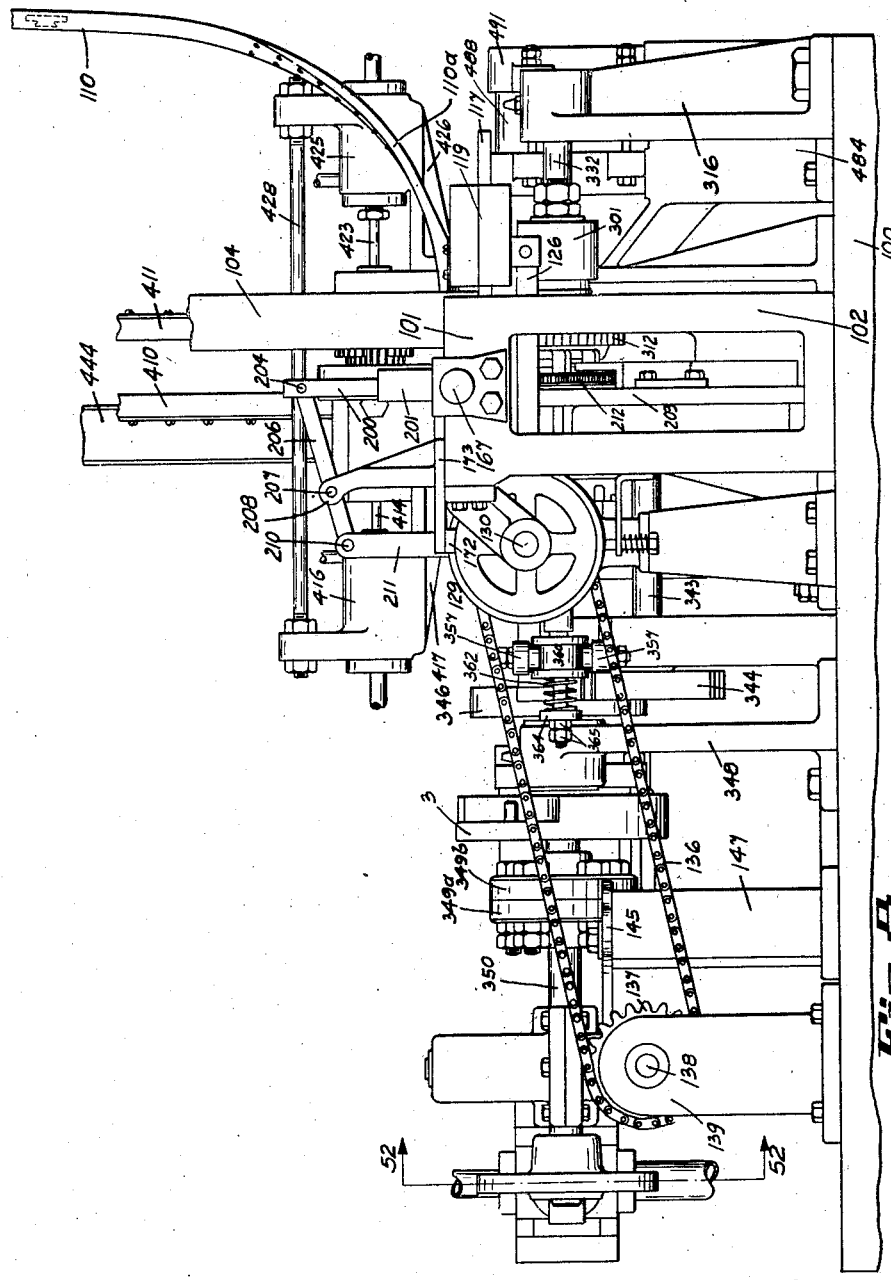
Figures 9, 10:
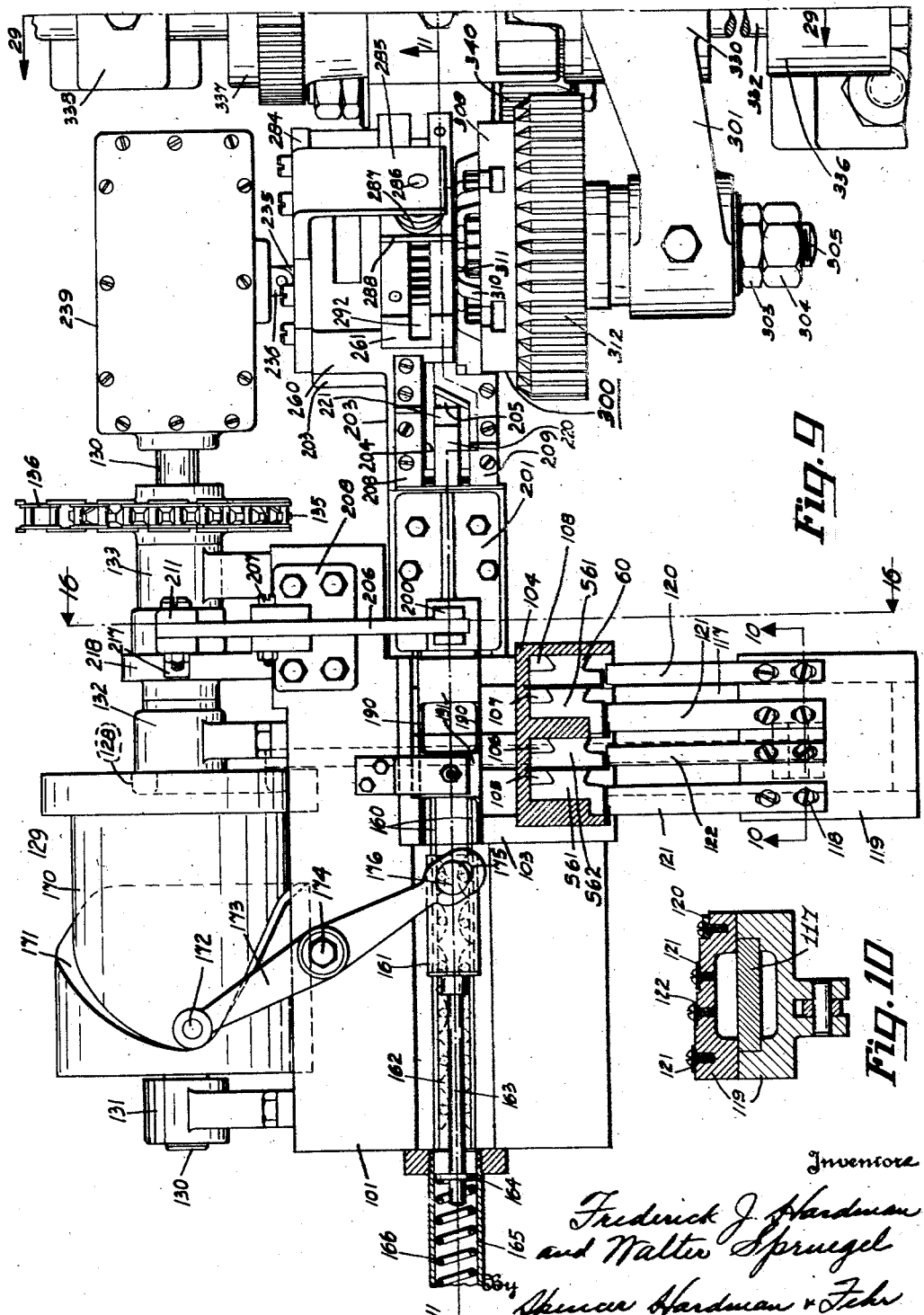
Figure 21:
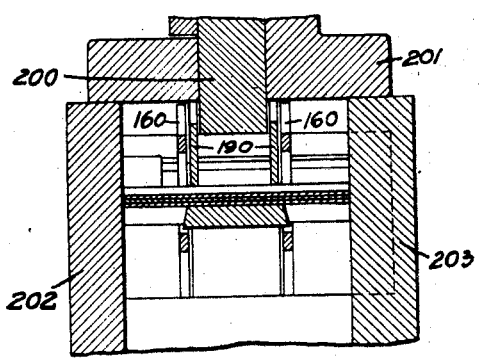
Figure 20:
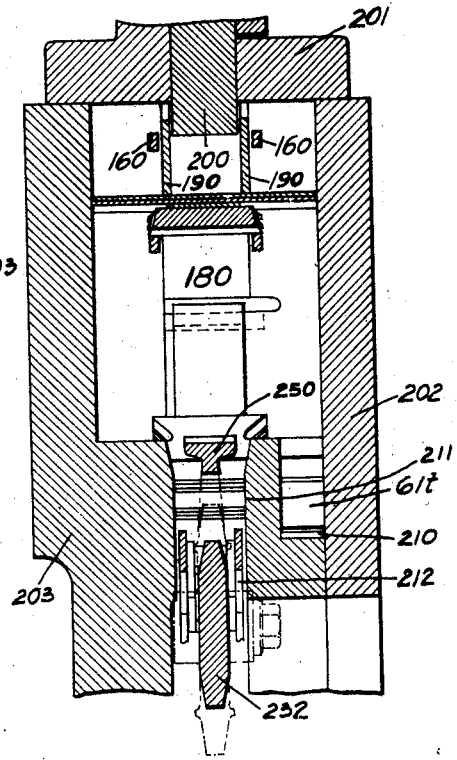
Figure 22:
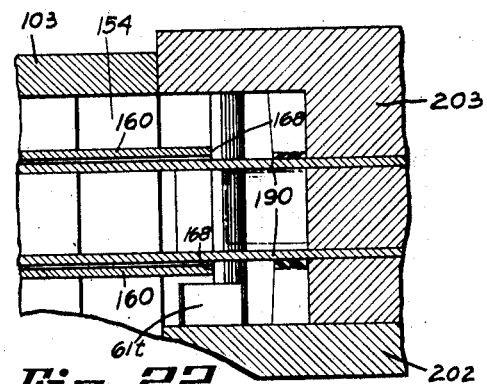
Figure 23:
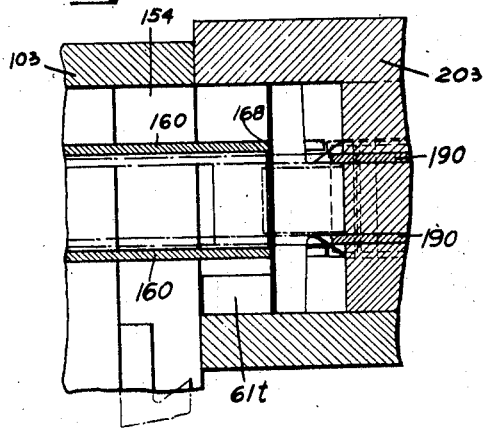
Figure 24:
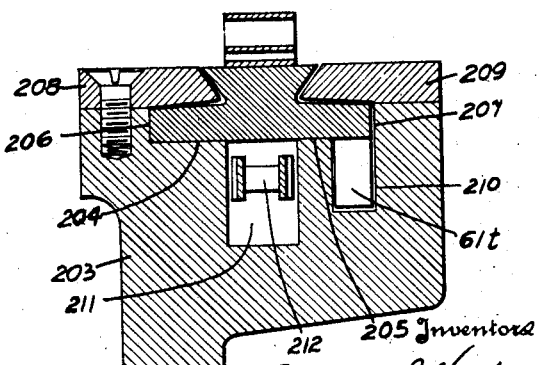
Figure 31:
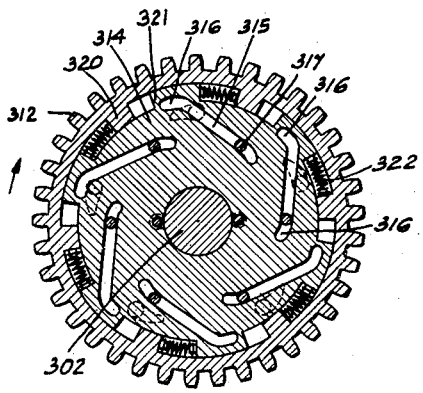
Figure 30:
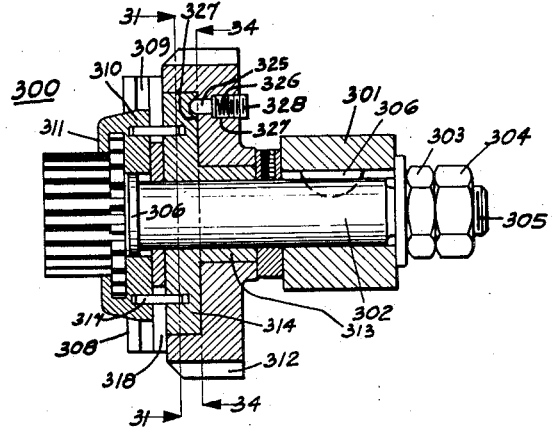
Figure 32:
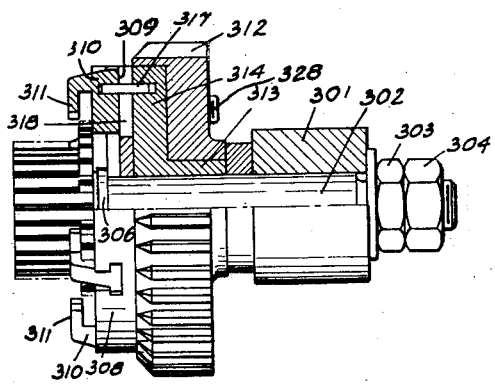

Figs. 3 and 4 constitute a mechanical diagram, showing some of the various operations performed by a machine embodying the present invention;

Figs. 5 and 6 taken together constitute a plan view of the machine;

Fig. 7 is a front elevation looking in the direction of the arrow 7 of Figs. 5 and 6;

Fig. 8 is a left side elevation looking in the direction of the arrow 8 of Fig. 5;

Fig. 9 is a fragmentary plan view of a portion of the machine shown in Fig. 5, and is drawn to a larger scale than Fig. 5;

Fig. 10 is a sectional view taken on the line 10—10 of Fig. 9;

Fig. 11 is a fragmentary sectional view taken on the line 11—11 of Fig. 9;

Fig. 12 is a fragmentary sectional view taken on the line 12—12 of Fig. 11;

Figs. 13, 14 and 15 are fragmentary sectional views showing certain parts which are shown in Fig. 11, and these views are drawn on a larger scale than Fig. 11. Figs. 13, 14 and 15 show successive stages in the operation of assembling the segments of the commutator into an orderly row of various segments which are grouped in orderly recurrent sequence;

Fig. 16 is a sectional view on the line 16—16 of Fig. 9;

Figs. 17, 18 and 19 are fragmentary sectional views on a large scale, showing various stages in the operation of feeding the keystone-shaped commutator segments into the machine, these figures being sectional views on the line 17—17 of Fig. 5;

Fig. 20 is an enlarged scale sectional view taken on line 20—20 of Fig. 13;

Fig. 21 is an enlarged scale sectional view taken on line 21—21 of Fig. 13;

Fig. 22 is an enlarged scale sectional view taken on the line 22—22 of Fig. 13;

Fig. 23 is an enlarged scale sectional view taken on the line 23—23 of Fig. 14;

Fig. 24 is an enlarged scale sectional view taken on the line 24—24 of Fig. 13;

Fig. 25 is a sectional view taken on the line 25—25 of Fig. 26;

Fig. 26 is a sectional view taken on the line 26—26 of Fig. 25;

Fig. 27 is a sectional view taken on the line 27—27 of Fig. 25;

Fig. 28 is a fragmentary side view looking in the direction of arrow 28 of Fig. 25;

Fig. 29 is an enlarged scale sectional view taken on the line 29—29 of Fig. 6;

Fig. 30 is an enlarged scale sectional view taken on the line 30—30 of Fig. 6;

Fig. 31 is a sectional view taken on the line 31—31 of Fig. 30;

Fig. 32 is a side elevation of the mechanism shown in Fig. 30 and is partly in section on the same section line as Fig. 30, which shows the mechanism in a different position of operation.

Figure 33:
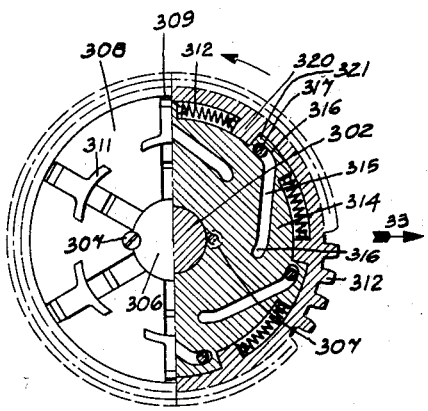
Figure 34:
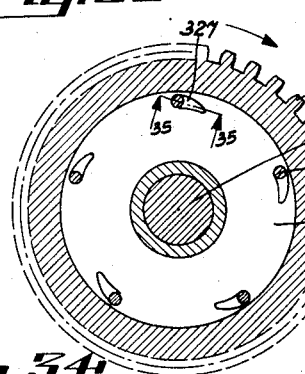
Figure 35:
Figure 57:
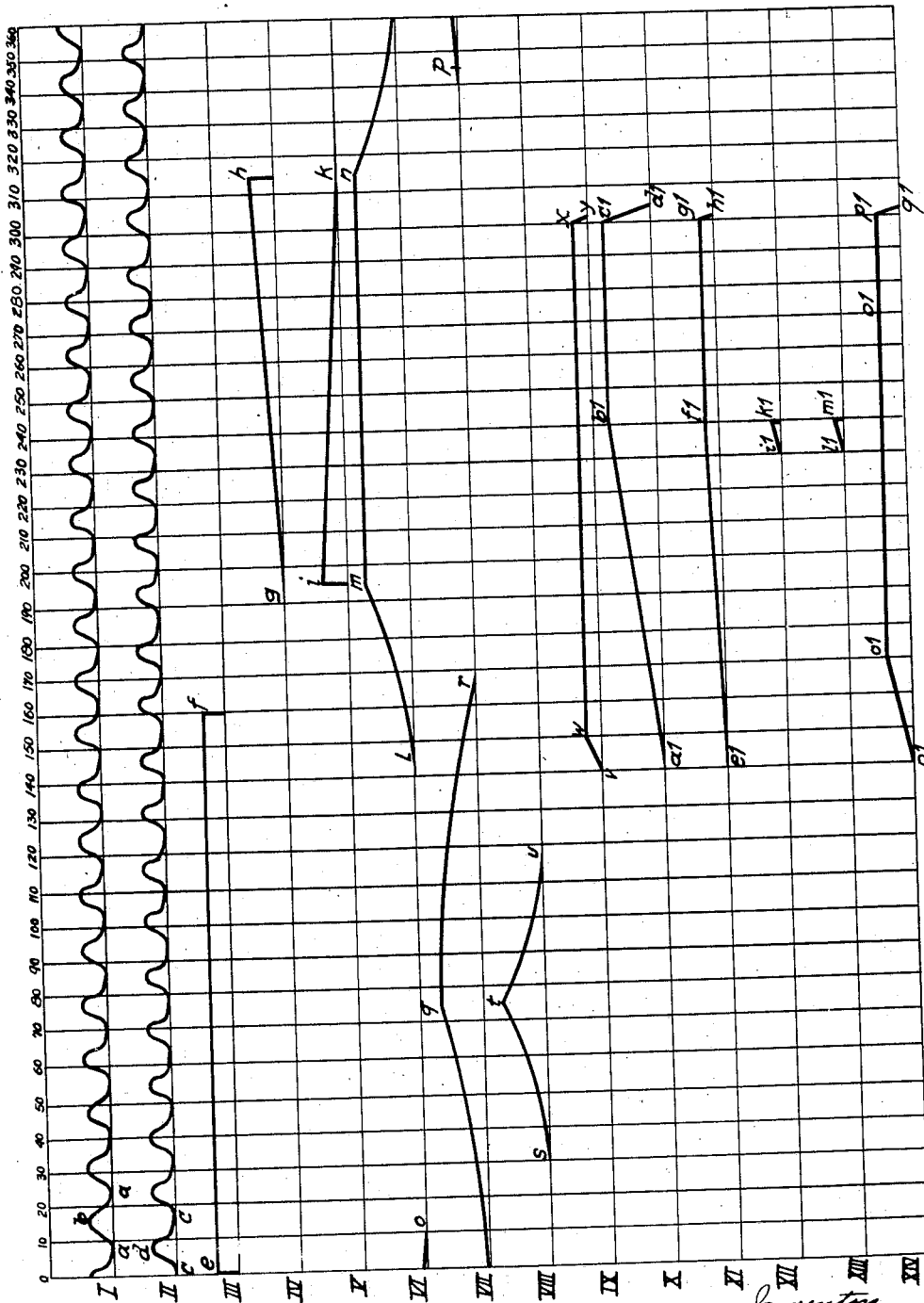

Fig. 33 is an end view taken in the direction of arrow 33 of Fig. 32 and is partly in section, the section being taken on the line 31—31 of Fig. 30 and shows parts shown in Fig. 31 in a different position of operation;

Fig. 34 is a sectional view taken on the line 34—34 of Fig. 30;

Fig. 35 is a sectional view taken on the line 35—35 of Fig. 34;

Fig. 36 is an enlarged scale fragmentary sectional view taken on the line 36—36 of Fig. 6, or 36—36 of Fig. 44;

Fig. 37 is an enlarged scale fragmentary sectional view taken on line 37—37 of Figs. 5 and 6;

Figs. 38, 39 and 40 are enlarged scale fragmentary sectional views taken on the line 38—38 of Fig. 6; and show the mechanism in various positions of operation;

Fig. 41 is a fragmentary sectional view taken on the line 41—41 of Fig. 39;

Fig. 42 is a fragmentary sectional view taken on the line 42—42 of Fig. 6;

Fig. 43 is a fragmentary sectional view taken on the line 43—43 of Fig. 37;

Fig. 44 is an enlarged scale fragmentary sectional view taken on the line 44—44 of Fig. 6;

Fig. 45 is a sectional view taken on the line 45—45 of Fig. 44;

Fig. 46 is an enlarged scale sectional view taken on the line 46—46 of Fig. 6;

Figs. 47 and 48 are fragmentary sectional views taken respectively on lines 47—47 and 48—48 of Fig. 46;

Figs. 49 and 50 are fragmentary sectional views on an enlarged scale showing progressive stages of operation of the mechanism shown in Fig. 46;

Fig. 51 is a sectional view similar to Fig. 46 and shows the final stage of operation of the mechanism;

Fig. 52 is partly a diagram showing the connections with fluid pressure cylinders and valve mechanism for controlling these connections said valve being shown on line 52—52 of Fig. 6, or 52—52 of Fig. 8; and Fig. 53 is a chart showing the relation of the various operations performed by the machine during each cycle of operation thereof and is based on each rotation of the main operating shaft of the machine.

Referring to Figs. 1 and 2 the commutator comprises an annulus of segments 60 which are keystone or wedge shaped in cross section, flat sheet metal riser bars 61, arranged in pairs between which a segment 60 is located, and an insulating segment 62 which insulates each group of two riser bars 61 and a segment 60 from adjoining groups. In the manner to be described this annulus of commutator segments is automatically assembled and is then secured in permanently assembled relation by means of clamping V-rings 63 and 64 which engage the side of the dove tail tangs of the segments and which are secured in clamping position under pressure by tubular core 65 having its end edges 66 and 67 deformed against the outer faces of the rings 63 and 64. The insulation rings 68 and 69 insulate the clamping rings 63 and 64, respectively, from other parts of the commutator.

In the machine to be described all of the operations on the commutator shown in Figs. 1 and 2 are performed automatically in a manner which will be described briefly in respect to the mechanical diagram shown in Figs. 3 and 4. The segments 61 and 62 are punched from sheet material and are stacked up in magazines in vertical stacks designated by S61, S60 and S61 in Fig. 3, the lowermost segments of the stacks, which are supported by a horizontal table being numbered 61a, 62a and 61a to denote the initial position of these segments. The segments 60, being wedge shaped in cross section, cannot be arranged in vertical stacks but are fed in a row through a suitable chute to be described. The movement of the segments 60 is indicated by the arrows 70 and 71 in Fig. 4, the initial position of the lowermost segment 60 is indicated at 60a in Fig. 4.

The first operation performed by the machine is to move the lowermost segments away from their respective stack or chute by moving them in the direction indicated by arrow 71 into the positions 61b, 62b, 61b and 60b, respectively. In the latter position the segments are arranged in an orderly row preparatory to stacking them in orderly manner one upon the other.

The next operation performed by the machine is to move the segments from position 61b, 62b, 61b and 60b in the direction of the arrow 72 and to cause these parts to be stacked one upon the other, the segment at 60b being on the bottom. The stack of parts is indicated by numerals 61c, 62c, 61c and 60c, indicating that the machine prepares a small group of stacked parts comprising a segment 60 on the bottom, a riser bar upon the segment then next an insulating segment 62 and upon the latter another riser bar 61.

The machine next then moves this stack of parts in the direction of arrow 72a in order to locate several groups of these stacked parts in a straight row, indicated at 73. When this row 73 comprises a certain number of orderly arranged parts then all of the parts in that row are moved together in the direction of the arrow 74 in order to form an annular row of parts indicated at 75. When the parts are maintained in an annular row they are moved in the direction of the arrow 76 in a suitable gripping mechanism which draws these parts from the annulus forming device and transfers them to the position shown at 77. Then the gripping device moves in an arcuate path, indicated by the dot-dash line 78 and arrow 79, into a position 80 which is in horizontal alignment with one of four annulus receiving recesses provided by a conveyor disc 81. The gripping mechanism moves the annulus from position 80 in the direction of arrow 81, which is parallel to the axis X—X of the disc 81, in order to place the annulus of parts within one of the recesses of the disc 81 as indicated by the dot-dash line position 82.

The disc 81 rotates intermittently a quarter revolution about its axis X—X in the direction of the arrow 83 in order to bring the annulus of segments successively into position 84, 85 and 86. When the annulus is in position 84, pairs of loosely assembled rings 63–68 and 64–69 are moved respectively, in the direction of arrows 87 and 88 in order to locate them in position against the sides of the tangs of the segments as shown in Fig. 2. Then the assembly of the annulus of segments with pairs of rings 63–68 and 64–69 is moved into the position 85, in which position the tubular core 65 is moved in the direction of the arrow 89 to locate it centrally within the annulus; and while in this position, the core 65 is deformed as shown at 66 and 67 in Fig. 2 in order to secure the commutator parts in permanently assembled relation. Finally the assembly is moved from the position shown at 85 to that shown at 86, and while the disc 81 remains stationary the assembly is pushed out of the disc into the ejected position shown at 90.

From the mechanical diagram, which has been described, it is apparent that the machine comprises in the main the following principal parts: the magazine for receiving pieces punched from flat material and a delivery mechanism for receiving segments of wedge shaped cross section; a mechanism for moving the lowermost parts from their respective magazines or chutes into a row in which the parts rest on their flat sides; a mechanism for moving the parts from a flat row to a stack of grouped parts; a mechanism for moving each stack of parts into a straight row; a mechanism for moving a row of predetermined number of grouped parts into an annulus or circular row; a mechanism for transferring the annulus of segments from the annulus forming device to a conveyor disc having 4 stations namely a loading station, two work stations and an unloading station; a mechanism for assembling with the annulus, when it arrives at the first work station, pairs of pre-assembled clamping rings and insulating rings; mechanism for assembling with the assembly of the first work station; a central core when said assembly has arrived at the second work station, and for deforming the edges of the core against the outer faces of the clamping rings; and a mechanism for ejecting the completed commutator from the conveyor disc.

Magazine and delivery chutes

The entire mechanism is supported by a table 100 which in turn supports a table 101 elevated above table 100 by legs 102. Referring more particularly to Fig. 9, table 101 is shown carrying a shelf 103, supporting the magazine frame 104, which provides recesses 105, 106 and 107 for receiving stacks S61, S62 and S61 of riser bars, mica segments and riser bars, respectively, as shown diagrammatically in Fig. 3. The magazine 104 provides also a recess 108 for receiving the lowermost segment 60 of wedge shaped cross section. The segments 60 are delivered in end to end relation through a suitable delivery chute 110, the major portion of which extends vertically as shown in Fig. 8 and which terminates in a portion 110a, making a one quarter turn with respect to the main portion of the chute. In this way the segments are caused to move from positions in which they are supported on edge gradually in the positions in which they are supported more and more on their bottom sides in order to minimize friction between the walls of the chute and the segments 60.

As the segments 60 pass from the lower end of the chute 110a they fall upon the shelf 103 and are confined within the magazine recess 108. The weight of the segment 60 in the vertical portion of the chute 110 causes the segment 60 to be pushed against the stop 111, shown in Fig. 17 and a pair of flexible springs 112 and 113, attached to a block 104a by screws 114, press the spring segment 60 against the top of the shelf 103. The block 104a is attached to the magazine 104 in any suitable manner.

Transfer of segments from magazine and chute

The lower most segments 61, 62, 61 and 60 are transferred from the lower-most positions in their respective stacks designated 61a, 62a, 61a and 60a in Fig. 3 to position 61b, 62b, 61b and 60b indicated in Figs. 3 and 15, by a mechanism which operates fingers 121, 122, 121 and 120, respectively, attached by screws 118 to a slide 119, guided for horizontal sliding movement by an extension 117 of the table 101. The slide 119 is connected by a pin 125 with a bar 126, guided for horizontal movement in guide-way 126a provided in the legs 102 of the supporting table 101. The right hand end of bar 126 carries a roller 127, received by a cam race 128, cut in the face of a cam disc 129, rotated by a shaft 130, as shown in Fig. 16. Shaft 130 is journaled in bearing brackets 131, 132, and 133, attached in any suitable manner to the legs 102 which support the table 101. Shaft 130 carries a sprocket wheel 135 driven by a chain 136, connected with a sprocket wheel 137 of the same diameter in pitch as wheel 135 and mounted on a shaft 138, rotatably supported in bearing brackets 139, 140 and 141. The shaft 138 is driven by a power operated pulley 142, normally loose on the shaft 138 and connected therewith through a sliding clutch member 143, connected with the pulley 142 and movable into engagement with a clutch member 144, integral with the sprocket wheel 137 which drives the shaft 138. The clutch member 143 is shifted by a lever 145, attached as at 146 to a bracket 147 and pivotally connected at 148 to a clutch shifter 149. Sprocket wheels 135 and 137 being of the same diameter, shaft 130 rotates at the same speed as shaft 138. Shaft 138 drives a main operating shaft 150 through reducing gears contained in a gear box 149.

Referring to Fig. 1 it will be noted that there are 23 groups of segments in the commutator illustrated as an example of the type of work performed by this machine. During each cycle of operation of the machine, i. e. when one completed commutator is delivered, there will be one complete revolution of the shaft 150. Since the commutator given as an example has 23 groups of segments, it is necessary that the shaft 130 operates 23 times as fast as shaft 150. Therefore, the ratio of gearing in the gear box 149 is 1 to 23, hence during each machine cycle, 23 groups of segments will be delivered from the magazines to the inner end of the shelf 103. It will be noted by referring to Figs. 11 to 15 that the shelf 103 is grooved to provide grooves 151, 152, 153 and 154, for receiving the respective segments, and that a ridge 155 separates grooves 151 and 152, a ridge 156 separates grooves 152 and 153, and a ridge 157 separates grooves 153 and 154.

After the fingers 121, 122, 121 and 120 have pushed the segments into position 61b, 62b, 61b and 60b, respectively, at the inner end of the shelf 103, the segments are next stacked by the machine to form a pile of segments 60c, 61c, 62c and 61c, as indicated in Fig. 3.

Mechanism for stacking segments in groups

The segments are moved from the b positions to the c positions in the manner indicated by the arrow 72 by mechanism comprising a pair of horizontal slidable bars 160, attached to a slide 161 which is guided for sliding movement transverse to the direction of movement of the head 119, within suitable guide-ways 162, provided by the table 101. These slides 160 carry a rod 163 which carries a collar 164, sliding within a tube 165, receiving a spring 166, one end of which bears against the collar 164 and the other against a cap 167, attached to the tube 166. The spring 166 operates to move the bars 160 toward the right so that the surface 168 of the bars may engage successively the left-hand edges of the segments in order to move them from the b position shown in Fig. 15 to the c position shown in Fig. 14. Spring power is utilized to stack the segments rather than direct machine power, so that, in case the machine would not perform properly and the bars 160 would be arrested by the jamming of the segments, no harm would result to the machine. The bars 160 are moved toward the left and the spring 166 is there being compressed by power-operated mechanism including a drum cam 170, rotated by the shaft 130 and provided with a cam surface 171, engaging a roller 172, carried by lever 173, pivoted at 174 upon the table 101 and providing a slot 175 which receives a screw stud 176, attached to the slide 161.

When the spring 165 is released by the cam 170 to permit the bars 160 to move towards the right, the bars 160 will first engage the left-hand edge of a riser bar segment at 61b and push the same out of the groove 151 over the ridge 152 and slide the same upon a mica segment 62 at position 62b. The mica segment 62 and the riser bar segment 61, then being supported by the said mica, will be slid together over the ridge 156 and upon the top of a second riser bar segment 61, then located at 61b. The second riser bar segment with the mica segment and the first said riser bar segment, now lying on top of the second riser bar segment, will be slid together over the ridge 157 and then upon a segment 60, then located at 60b. The stack of segments, to wit, segment 60 at the bottom carrying in order riser bar 61, mica 62, and riser bar 61, will be moved out of the groove 154 and into a space above the mouth 180 of a track in which the groups of segments are arranged in a straight row, as indicated at 73 in Fig. 3.

As the bars 160 continue to move slightly further toward the right the segment 60 is pushed against a slide 181, urged toward the left by spring 182 and stopped by a stop bar 183, received by a notch 184 in the bar 181. After the right hand edge of the segment 60 has been pushed against the slide 181 the left hand edge of the segment 60 will drop into a notch 185, provided by a slide 186, urged toward the right by a spring 187 and stopped by a stop plate 188 attached thereto, said stop plate 188 being received within a groove 189 provided by the shelf 103. It will be seen by referring to Fig. 14, that the stack of segments 60c, 61c, 62c, 61c, rests upon the rounded surfaces 181a and 186a of slides 181 and 186, respectively. These segments are held in this stacked position by a pair of pressure bars 190, tied together by yokes 191 and pivoted at 192. All during the time that the segments are being moved from their b position to the c position these pressure bars bear against the upper surfaces of these segments with yielding pressure exerted by spring pressed plungers 192a, urged downwardly by a spring 193 (see Fig. 11). The pressure bars 190 yieldingly maintain the left hand edges of segments against the right hand edges of the bars 160, so that the segments will not be disarranged by the blow exerted upon them as the bars 160 move toward the right.

*Transfer of groups of stack segments into the track*

The stack of segments located upon the slides 181 and 186, including the mouth 180 as shown in Fig. 14, is now ready to be transferred into the position within the track as shown in Fig. 15. This is accomplished by a plunger 200 guided for vertical movement in a bracket 201, mounted upon a plate 202 and a frame 203, the latter also supporting the annulus-forming device which will be described later. The plunger 200 carries a pin 204, received by a slot 205 of a lever 206, pivoted upon a pin 207, carried by a bracket 208 which is attached to the table 101 in any suitable manner. The lever 206 provides a slot 209, receiving a pin 210, attached to a bar 211 which is provided for vertical slidable movement relative to the shaft 130, with a slot 212 in the bar 211 within which the said shaft is located, and guided also by a screw 213 which passes through an aperture in a bracket 214, said aperture being in vertical alignment with the shaft 130. The screw 213 is threadedly connected with the lower end of the bar 211. The bracket 214 is attached by screws 215 to a table leg 102. A spring 216 bearing down upon the head of the screw 213 and upwardly against the bracket 214, urges the bar 211 downwardly and a cam roller 217 carried thereby into engagement with a cam 218, rotated by the shaft 130.

The bar or plunger 200 operates to move each group of stacked segments downwardly between the slides 181 and 186 which yield sidewise to permit the segments to pass into the track provided by the frame 203. As shown in Fig. 24, the frame 203 is grooved to provide track surfaces 204 and 205 upon which the lower edges of the segments rest. The end edges of the segments are confined between the surfaces 206 and 207, the dovetailed tangs of the segments are embraced by bars 208 and 209 attached to the frame 203 in any suitable manner, which serve to retain the segments upon the track surfaces 204 and 205. The frame 203 is provided with a groove 210 to provide clearance for the riser bar tangs 61t. The frame 203 is provided with a channel 211 to provide a clearance for a conveyor chain 212.

Movement of the groups of segments through the track is resisted by a number of leaf springs 220, 221, 222 and 223, which tend to retard movement of the segments, so that they will progress through the track only when moved by the plunger 200 or when moved by a chain conveyor to be described.

*Chain conveyor for moving segments through track*

When a certain number of groups of segments have accumulated in the track as the result of the successive downward movement of the plunger 200, the row of groups of segments in the track are bodily moved through the track and into an annulus-forming device by a chain conveyor. This conveyor comprises the chain 212 passing over a driving sprocket wheel 231 and driven sprocket wheel 232 and around an idler or takeup wheel 233. The wheel 231 is driven by a shaft 234, supported by the frame 203 and driven through a coupling 235, (see Fig. 5) connected with a shaft 236, passing through a gear 237, driven by a gear 238, which in turn is driven by shaft 130. The gears 237 and 238 are contained within a box 239. The sprocket wheel 232 is journaled on a stub shaft 240. The pulley 233 is journaled on a shaft 241, carried by a bracket 242, attached to the shank 243, passing through a bracket 244 which is attached by screws 245 to the frame 203. A spring 246, surrounding the shank 243 bears downwardly against a collar 247 of said shank and upwardly against the bracket 244, thereby yieldingly urging the wheel 233 downwardly to take up the slack in the chain 212.

The chain 212 carries a pusher lug 250, which is adapted to engage the left end segment 61L of the row of segments, while said segment 61L is in the position into which it was moved by the last downward movement of the plunger 200, which downward movement occurred just before the lug 250 began to engage the segment 61L of the row of segments. The length of the chain 212 is so selected that its movement is such with respect to the operation of the plunger 200 that the lug 250 can move the row of segments a substantial amount as shown in Fig. 15, before the plunger moves the next group of stacked segments from the mouth 180 of the track into the position shown in Fig. 15.

The conveyor chain operates to move the row of groups of segments from the straight track into the circular track provided by an annulus forming device.

Annulus forming device

Referring to Figs. 25 to 28 and Fig. 11, the frame 203 supports a fixed block 260, a yieldable block 261 and a rotatable shaft 262, which are so constructed and arranged as to provide an annular track 263 into which the segments are moved by the chain conveyor. As the segments move down the track, they are first engaged by a plurality of leaf springs 264, carried by blocks 265, attached by screws 266 to each of the cover plates 208 and 209, shown in Fig. 24. Passing the springs 264 the foremost segment of the row in the track next engages a vane 270, carried by the shaft 262. As the segments are pushed into the circular track 263, the shaft 262 rotates in a counterclockwise direction, making one revolution as all of the segments are pushed into the annular track. As the segments descend through the annular track on the left hand side of the shaft 262, they are retained by the vane 270. The segment 61L, is retained in the annular row of segments by a leaf spring 271, attached to the shaft 262 when the lug 250 swings away from said segment 61L as shown in Fig. 26. This last segment, being pressed by the spring 271 against the cylindrical side wall of the circular track 263, yieldingly resists by frictional resistance further rotation of the shaft 262. Hence the segments will remain in the positions shown in Figs. 26 and 28 until removed from the annulus forming device. The rotatable shaft 262 is journaled in bearings 280 and 281, provided by the block 260, and the shaft 262 is retained axially by a collar 282, secured to said shaft by a set screw 283. The block 260 carries a bracket 284, having a part 285 which extends above the block 261 and which carries a stud 286, retaining in position a spring 287 which bears against a plate 288, which in turn bears against the block 261. The plate 288 carries a spring retaining stud 289. The spring 287 yieldingly urges the block 288 against the block 260. The block 261 is guided for movement relative to the block 260 by pins 290 pressed into the block 260 and extending through holes in the block 261. In case of jamming of the segments within the circular track 263, the block 261 can move away from the block 260 in order to prevent damage to the apparatus. The block 261 is provided with a notch 292 in order to permit using a tool to pry out any segments which have become wedged in the track 263.

The annulus of commutator segments having been prepared, the next step is to transfer the annulus from the annulus forming device to the conveyor disc 81 which then conveys the annulus to different stations where other operations are performed.

Annulus transfer mechanism

The annulus transfer mechanism comprises chiefly a pair of chucks, either one movable from the annulus forming device to the conveyor disc 81, while the other chuck moves from the conveyor disc 81 to the annulus forming device.

Each chuck designated in its entirety by number 300 will now be described with reference to Figs. 30 to 35. A frame 301 carries a non-rotatable stub shaft 302, secured thereto by nuts 303 and 304, engaging the threaded end 305 of the shaft. A key 306 prevents the shaft from turning relative to the frame 301. To the head 306 of the stub shaft 302 is fixed by screws 307, a guide plate 308, having radial slots or grooves 309, each receiving a block 310, carrying a chuck jaw 311 of internal annular contour adapted to embrace an annulus of commutator segments. These jaws 311 are moved simultaneously radially by a mechanism operated through a gear 312, rotatable on the hub 313 of plate 314 which in turn is rotatable upon the stub shaft 302. The plate 314 provides a plurality of grooves 315 each having oblique portions 316. Each slot 315 receives a pin 317, attached to a chuck jaw block 310. The jaw's guide plate 308 is slotted at 318 to provide for movement of the pins 317 radially with respect to the axis of the stub shaft 302. When the gear 312 is rotated clockwise as viewed in Fig. 31, motion will be transmitted non-yieldingly from the gear 312 to the plate 314 through the agency of lugs 320, provided by the gear and adapted to engage lugs 321, provided by the plate 314. When the plate 314 is turned clockwise the pins 317 and hence the jaws 311 will be cammed radially outwardly to retract the jaws from the annulus of the commutator segment. When the gear 312 is driven counterclockwise, motion will be transmitted yieldingly to plate 314 through springs 322. Therefore, the pins 317 and hence the chuck jaws will be moved radially inwardly, thereby engaging the annulus of segments yieldingly with pressure. Fig. 33 shows the outer position of the pins 317 which retract the chuck jaws 311. It will be noted that these pins are received by the oblique portions 316 of the camming slots 315. These oblique or arcuate outer portions 316 provide for a slight over travel of the gear 312 beyond that required for retracting the chuck jaws. Fig. 31 shows the jaw-operating pins 317 in inner position. The gear 312 is caused to travel further in a counterclockwise direction than is necessary to move the jaws into engagement with the commutator annulus. During the over travel of the gear 312 relative to the plate 314, the springs 322 are compressed in order to apply yielding pressure to the plate 314 and hence to the pins 317. As will be explained later, the gear 312 is not in mesh with any driving gear while the loaded chuck is being transferred bodily from the annulus forming device to a position in alignment with one of the work-holder recesses of the conveyor disc 81. In order to hold the gear 312 in the position relative to the plate 314 shown in Fig. 31 when the chuck is being transferred bodily as stated, there are provided a plurality of plungers 325, each urged by a spring 326 into a recess 327, provided by the plate 314. The springs 326 are retained by screw plugs 328. In this way the gear 312 is held yieldingly in the position relative to the plate 314 as shown in Fig. 31, in which relative position, the pins 317 and hence the jaws 311 are urged toward the commutator annulus with yielding pressure. Therefore, the chuck adapts itself to engagement with the commutator annulus, although there may be slight variations in the external diameter of the annulus due to slight variations in the dimension of the segments.

The frame 301 which supports the chucks 300 has a hub 330, attached by screws 331 to a shaft 332 which is supported for rotary and axial movement by bearings 333, 334, and 335, provided respectively by brackets 336, 337 and 338, all attached to the table 100 in any suitable manner.

When the chucks 300 are in position respectively, for receiving a commutator annulus from the annulus forming device and for delivering a commutator annulus to the conveyor disc 81, the gear 312 of the chuck for receiving an annulus will be in mesh with a gear 340, meshing with a gear 341 which in turn meshes with the gear 312 of the chuck which is positioned for delivering an annulus to the disc 81, as shown in Fig. 37. Gear 340 is mounted on a stub shaft 342, carried by the bracket 337. Gear 341 is driven by a shaft 343, journaled on the bracket 337 and carrying a Geneva driven gear 344 which co-operates with a pin 345 of a Geneva gear driving discs 346, which is mounted on a shaft 350 (see Fig. 6), journaled in brackets 347 and 348, and connected with shaft 150 by coupling members 349a and 349b. The shaft 350 rotates the disc 346 in counterclockwise direction, and during a part of each revolution of disc 346 the Geneva gear driven member 344 and hence gear 341 is turned approximately 120 degrees in a clockwise direction at the time that gears 312 are in mesh with gears 340 and 341. Therefore, the right hand gear 312 will be rotated approximately 60 degrees in a counterclockwise direction and the left hand gear 312 will be rotated at the same time approximately 60 degrees in a clockwise direction. When a gear 312 is rotated clockwise, as viewed in Fig. 37 or 34, or counterclockwise, as viewed in Figs. 31 and 33, the chuck jaws 311 which, before closing the chuck, clear the riser bar tangs as shown in Fig. 32, will be caused to move into engagement with the commutator annulus as shown in Fig. 30 by the 60 degrees revolution of gears 312 as viewed in Fig. 37. Obviously counterclockwise rotation of gear 312 in the right hand position as viewed in Fig. 37 will cause the chuck jaws to be retracted from the annulus of segments so that the chuck may be withdrawn from the disc 81, thus leaving the commutator annulus within the workholder of the disc.

After the left hand chuck has been operated for gripping an annulus and the right hand chuck has been operated for releasing an annulus, the chuck must be bodily retracted respectively from the annulus forming device and the disc 81. This is effected by mechanism comprising a drum cam 351, mounted on shaft 350 and having a race 352, cooperating with a roller 353 attached to a lever 354, pivoted on a screw 355 which is attached to a bracket 356. The lever 354 is provided with two arms 357, each carrying a screw stud 358 upon which is journaled a roller 359, received by a grooved collar 360, loosely mounted on an extension 361 of shaft 332. The collar is urged by a spring 362 toward a shoulder 363 of the shaft 332, said spring being retained by a washer 364, secured by nuts 365 attached to the threaded right hand end of shaft 332. When the cam 351 operates to turn the lever 354 counterclockwise as viewed in Fig. 6, the shaft 332 and hence the gears 312 will be moved toward the left as viewed in Fig. 29, i. e. out of mesh with gears 340 and 341. When the lever 354 is operated by the cam 351 in a clockwise direction the shaft 332 will be moved toward the right as viewed in Fig. 29, in order to mesh the gears 312 with gears 340 and 341. In order to allow for variation in manufacture, the lever 354 is caused to travel further than is necessary to receive a commutator annulus from the annulus forming device and to deliver another annulus into the conveying disc 81. The lost motion between the collar 360 and the shaft 332 is taken up by spring 362 which serves yieldingly to transmit motion from the collar 360 to the shaft 332 in a direction from left toward right as viewed in Fig. 29.

In order to properly locate the hub 330 with respect to the bracket 337, so that the gears 312 will be located in horizontal alignment before being moved toward the gears 340 and 341 to mesh with them, the hub 330 is provided with a hardened metal finger 366, adapted to enter a notch 367 provided by hard metal member 368 attached to the bracket 337. The member 366 and the notch 367 are slightly tapered so as to facilitate entrance of the finger 366 into the notch 367. Hence movement of the shaft 332 toward the right causes the hub 330 to be located in exactly the correct position for meshing the gears 312 with the gears 340 and 341, regardless of slight variations in the amount of turning movement imparted to the shaft 332 when reversing the position of the chuck gears 312. The locating means described also facilitate meshing of the gears 312 with the gears 340 and 341.

While the shaft 332 is in its one end position, thereby maintaining the gears 312 out of mesh with the gears 340 and 341, the shaft 332 is rotated 180 degrees in order to reverse the positions of the chucks. This 180 degree rotation of shaft 332 is accomplished by mechanism comprising a novel 180 degree Geneva gear drive and a pair of meshing spur gears operated thereby.

The novel 180 degree Geneva gear drive is illustrated in Figs. 38 to 41. The shaft 350 carries a driving disc 370 carrying a driving roller 371, adapted to be received by either of the two notches 372 in a Geneva driven disc 373 the hub of which is provided with gear teeth 374 which mesh with a gear 375, which as shown in Fig. 29 is floatingly mounted on the shaft 332. Gear 375 being confirmed between surfaces 376 and 377, of bracket 337, cannot move endwise. Gear 375 carries a key 378 which is prevented from moving endwise also of bracket surface 376 and 377. Key 378 is received by a groove 379 of shaft 332. The Geneva gear driven disc 373 is mounted on a stub shaft 380 fixed to a bracket 381.

The shaft 350 rotates the driving disc 370 in a counter clockwise direction, as indicated by arrow 382 in Figs. 38, 39 and 40. Hence the disc 373 will be rotated 180 degrees during less than one-half of each rotation of shaft 350, as illustrated in Figs. 38, 39 and 40. The disc 370 carries a locking pin 383 adapted to be received by either of two arcuate locking grooves 384 or 385 provided by the driven disc 373.

The sequence of operations of the transfer mechanism is as follows: starting with the chucks located in close proximity to the annulus forming device and the conveyor disc 81, respectively, as shown in Figs. 5 and 6, the left hand gear 312 is rotated clockwise and the right hand gear 312 is rotated counterclockwise in order that the chuck adjacent the annulus forming device will grip the annulus and that the chuck adjacent the disc 81 will release the annulus, then located within a workholder of the disc. Then the shaft 332 is moved toward the left as viewed in Fig. 29 in order to move the gears 312 out of mesh with their operating gears 340 and 341, after this the said shaft 332 is rotated in order to reverse the positions of the chucks. Thereafter the shaft 332 is moved toward the right as viewed in Fig. 29 in order to mesh the chuck gears 312 with the gears 340 and 341, respectively, then the gears 312 are operated so that the loaded chuck, just previously transferred to the disc 81 will release the work which was introduced into the disc 81 during meshing operation of the gears 312 with the gear 340 and 341. Likewise the chuck which was open while being transferred to the annulus forming device will be operated so as to grip the work therein.

Conveyor disc and operating mechanism

The disc 81 is driven by a shaft 390 journaled in bearings 391 and 392 provided by frame 393 as shown in Fig. 44. The shaft 390 is journaled also in a hub 395 of the bracket 348 and carries a Geneva driven gear 396, operated by a driving pin 397, carried by a Geneva driving disc 398 which in turn is carried by the shaft 350. The disc 398 rotates in a counterclockwise direction as viewed in Fig. 37 in order to rotate the disc 81 intermittently 90 degrees in a clockwise direction as viewed in Fig. 37. The disc 81 carries four equiangularly spaced annulus receiving workholders which are moved progressively into four stations, namely, a loading station A where the work is received from the transfer mechanism; second, a station B where clamping and insulating rings are assembled with the annulus; third, a station C where the central core is assembled and secured permanently to the commutator; and fourth, an ejecting station D.

Each workholder comprises two semicircular clamping members 400 and 401 as best shown in Fig. 36. These members are received in a workholder recess 402 and are yieldingly urged by leaf spring members 403 and 404, respectively, against the periphery of the commutator annulus assembly. The annulus is guided into the workholder clamp, provided by members 400 and 401 by the movement of the annulus through a ring 405 secured by screws 406 to the disc 81, said ring having a conical bore 407. The annulus assembly is pushed between the clamping members 400 and 401 until it strikes a stop plate 408, also secured to the disc 81 and provided with a central opening 409 to permit the introduction of tools for performing other operations upon the annulus.

Mechanism for assembling clamping and insulating ring

At station B the clamping end rings 63 and 64 with their respective insulation rings 68 and 69 are assembled with the annulus. The mechanism for performing the assembling is best illustrated in Figs. 44 and 45. The rings 63 and 68 are nested by the operator and are fed through a chute 410, and the rings 64 and 69 are also nested by the operator and are fed through a chute 411. While the annulus is located in position 84, shown in Figs. 3 and 44, the lowermost assembly of rings 63 and 68 is pushed away from a support 412, which initially received the assembly of rings into an assembled relation with the annulus at 84 by plunger 413, attached by rod 414 to a piston 415, cooperating with fluid pressure means in a cylinder 416, integral with a bracket 417, secured by studs 418 and screws 419 to a block 420, which rests upon the frame 393 and supports the chute 410. Likewise the lowermost assembly of rings 64 and 69 which initially rested upon a support 421 is pushed into the assembled position by a plunger 422, attached by a rod 423 with a piston 424, cooperating with a fluid pressure cylinder 425, integral with a bracket 426, attached to a block 427, secured to the frame 393 and supporting the chute 411. To strengthen the construction the brackets 417 and 426 are connected together by tie rods 428, which resist the stressing of these brackets when fluid pressure is applied to the cylinders 416 and 425.

Obviously, when the plungers 413 and 422 are moved toward the left and toward the right, respectively, into positions indicated by dot-dash lines 413a and 422a respectively, the nested rings 63 and 68 in chute 410 will descend so that the lowermost nested assembly of these rings will rest upon the support 412, and likewise the lowermost nested assembly of rings 64 and 69, then in the chute 411, will descend and rest upon the support 421. The lowermost nested assembly of rings 63 and 68, resting upon the support 412 when the plunger 413 is retracted toward the left, is maintained upright by being confined between the right hand end of the plunger 413 and the left side wall of the disc 81 or rings 408 thereof. When the plunger 422 is retracted toward the right so that the lowermost nested assembly of rings 64 and 69 rest upon the support 421, this nested assembly is retained upright by the left hand wall of the bracket 427 and by three spring-urged plungers 430, urged inwardly by springs 431, confined within recess 432 provided by bracket 427 and retained therein by plugs 433. The plungers 430 are provided with bevel surfaces 434 so that the plungers will be cammed outwardly as the nested assembly of rings 64 and 69 is pushed toward the left into assembled position. After a pair of nested ring assemblies have been assembled with the annulus at station B and the plungers 413 and 422 have been withdrawn, the disc 81 is then automatically indexed 90 degrees to carry the work to station C where the final assembling operation is performed.

Mechanism for assembling and staking the central core

Referring to Figs. 46 to 50, when the commutator assembly is located at station C or at position 85 indicated in Figs. 3 and 46, the assembly will then be located in alignment with the lowermost central tube or core 65, then resting upon a support 440, carried by a platform 441, of the frame 393 as clearly shown in Figs. 44 and 45. The block 440 is located between guides 442 and 443, which support a chute 444 through which the cores 65 descend. The guides 442 and 443 guide for horizontal sliding movement two bars or slides 446 and 447 having projections 448 and 449, respectively. The slides 446 and 447 are integral with a plate 450, slidable with respect to a centrally disposed rod 451 to which is pinned a plate 452. Plate 452 is provided with holes 453 through which loosely pass adjusting rods 454, fastened by pins 455 to plate 450 and having threaded end receiving nuts 456. A spring 457, surrounding the rod 451, maintains the plate 450 extended from the plate 452. By adjusting the nuts 456 the plate 450 can be adjusted relatively to the rod 451 and hence the extensions 448 and 449 relative to the core-pushing and staking tool 460 which is attached by pin 461 to the rod 451.

The rod 451 is attached by a pin 462 to a piston rod 463, connected with a piston 464, cooperating with a fluid pressure cylinder 465 fastened by tie rods 466 to end plates 467 and 468, which provide fluid pressure passages 469 and 470, respectively. The frames 467 and 468 are secured to a bracket 471 mounted on the table 100.

The right hand end of the core 65 is staked by a tool 480, attached to a slide 481 having an annular extension 482 and guided through a bushing 483 in a bracket 484, which is also mounted on table 100. The slide 481 is attached by a pin 485 to a piston rod 486, cooperating with a piston 487 in a cylinder 488, secured by tie rods 489 to end plates 490 and 491, secured to the brackets 484 in any suitable manner. The end plates 490 and 491 provide fluid pressure passages 492 and 493 respectively.

The operation of the core assembling and staking mechanism is as follows: Starting with the mechanism as shown in Fig. 46, pressure fluid is introduced into the left end of the cylinder 465 and into the right end of the cylinder 488. This causes the rod 451 to move toward the right and the slide 481 to move toward the left. As shown in Fig. 49 the slide 481 has moved so that its annular projection 482 bears firmly against the clamping ring 64 of the commutator assembly. As the rod 451 moves toward the right, the staking tool 460 engages the left end of the lowermost core 65 and pushes the same from under the stack of cores as shown in Fig. 49 into the commutator assembly carried by the conveying disc 81. While the ring 64 is being pushed firmly toward the left by the slide 481, the projections 448 and 449 of the slides 446 and 447 are caused to bear firmly against the left hand clamping ring 63 through pressure applied from the rod 451 to a spring 457. Thus while the staking operation is being performed through the agency of tools 460 and 480 as shown in Fig. 50 the rings 63 and 64 are being firmly held in clamping position to hold the commutator assembly in proper position during the staking operation, which is completed through pressure exerted upon the left hand end of piston 464 and the right hand end of piston 487. The completion of the staking operation is shown also in Fig. 51.

Following the staking of the core 65 at station C the staking tools are retracted and the work is moved to station D where it is ejected.

*Commutator ejecting mechanism*

The completed commutator at station C indicated at 86 in Fig. 3 is ejected from the disc 81 at station D by means including a plunger 500, slidably supported by a bearing 501, carried by frame 393 and movable from normal position, shown by dot-dash line 500a, into the full line or ejecting position through the agency of a fluid pressure cylinder 502, cooperating with a piston 503, connected by rod 504 with said plunger 500. As the commutator assembly is pushed out of the work holder at station D, it moves along a slide block 510, constructed in such a manner as to cause the commutator to turn over from the position 90 into the position 91, following which the commutator will slide upon its riser bar end upon a suitable chute 511.

*Fluid pressure control device*

The fluid pressure operated pistons in all of the cylinders of the machine are operated at the same time, to wit during each rest interval of the conveying disc 81. One common compressed fluid distributing device has therefore been provided, comprising a valve body 520, having chambers 521, 522 and 523, intercommunicated through a central bore 524, both ends of which are closed by end covers 525 and 526, as shown in Fig. 52. The said central bore receives a sliding valve 527, threadedly connected to a valve rod 528, attached to a guide member 529, guided for horizontal movement within grooves 529a of the end cover 525. The guide member 529 carries a cam follower 530 adapted to engage a cam disc 531, secured to the shaft 150 by a set screw 532 or in any other suitable manner. A spring 534, located within a recess 533 of the valve 527 and about a pin 535 in the end cover 526 yieldingly maintains the cam follower 530 in constant engagement with the cam 531. Ducts 536 and 537 in the valve body 520 connect the valve chambers 521 and 522 with main supply pipe lines 538 and 539, respectively.

Pipes 540, 541, 542 and 543 branch off the main pipe 538 to connect the proper sides of the cylinders 465, 416, 502 and 488 with said main supply pipe. Pipe 543 continues as pipe 544 providing communication between pipe 543 and cylinder 425. Pipes 545, 546 and 547 branch off the other main supply pipe 539, connecting them with the proper sides of the cylinders 465, 416, 502 and 488. Pipe 548 connects branch pipe 547 with the proper side of cylinder 425.

In the position of the valve 527 as shown in Fig. 52, compressed fluid from any suitable supply (not shown) enters the chamber 523 through opening 550 of the valve body 520, and is allowed to flow through duct 536 into the main supply pipe 538, and from there through the various branch pipes to the proper sides of the cylinders, thereby moving the pistons therein away from the conveyor disc 81. Fluid opposite the pressure side of the pistons is pushed by the advancing pistons through the various branch pipes leading to the main supply pipe 539, through the latter itself, then through the duct 537, chamber 523 and finally through a passage 551 into a pipe 552 which leads to the low pressure side of a compressor (not shown).

Likewise, when valve 527 is in its left hand end position, compressed fluid enters the opening 550 and flows through duct 537, main pipe 539 and through its various branch pipes to the proper sides of the cylinders, thereby moving the pistons toward the conveyor disc 81. Fluid opposite the pressure side of the piston is pushed by the advancing pistons through branch pipes of main supply, pipe 538, pipe 538 itself, duct 536, chamber 521, passage 551 into the pipe 552 and finally reaches the low pressure side of the compressor.

One complete revolution of cam 531 effects one complete reciprocation of the piston in the various cylinders, namely an advance movement toward the conveying disc 81 and a retracting movement from said disc. Cam disc 531, being mounted on shaft 150, makes one complete revolution with each quarter of a revolution of the cam disc 81, due to the fixed ratio of 1 to 4 between the shaft 150 and the disc carrying shaft 390.

*Mode of operation*

In order to fully understand the sequence of operations to which the various parts of the commutator are subjected, special reference will be had to the chart shown in Fig. 53, wherein movements of the major operating members of the machine are shown graphically in actual timed relation with respect to 360° revolution of shaft 150. It will be understood from the preceding description of the machine that during each revolution of shaft 150 one quarter of a revolution of the conveying disc 81 takes place. It is also understood that every time the conveying disc makes a quarter revolution, an annulus of 23 groups of segments is transferred from the annulus forming device into the conveying disc. Hence 23 groups of segments must be delivered into the annulus forming device during each complete revolution of the shaft 150.

Referring to Figs. 2 and 53 and in particular to Fig. 53, the curve I consists of 23 rising lobes $a$—$b$ representing forward movement of fingers 120, 121 and 122 in order to push the segments from position $a$ to position $b$ as illustrated in Fig. 3, and of 23 descending lobes $b$—$a$, representing withdrawal of the said fingers.

Curve II consists of 23 rising lobes $c$—$d$, each representing forward movement of the bars 160 in order to move the segments from the $b$ position to the $c$ position, and of 23 descending lobes $d$—$c$, representing withdrawal of said bars 160. Note in the chart the alternation between the movements of the fingers 120, 121, 122, as illustrated in curve I, and of the bars 160 as illustrated in curve II.

Diagram III represents the time that the continuously traveling chain conveyor 212 requires to transport the row 37 of grouped segments to the annulus forming device. The line $e$—$f$ shows that it takes 160 degrees revolution of shaft 150 to transport such a row of segments and that during 200 degrees revolution of said shaft the chain conveyor travels idle.

Assuming that the chuck-carrying frame 301 is in close proximity to the conveying disc 81 and the annulus forming device, then the gripping period for that chuck adjacent the annulus forming device is represented by rising line $g$—$h$ in diagram IV.

Concurrent with the gripping period of one chuck is the ungripping period of the other chuck adjacent the disc 81. Descending line $i$—$k$ in diagram V, being for this reason shown vertically below line $g$—$h$ represents the ungripping period for said other chuck.

Bodily movement of the chuck-carrying frame 301 in order to move an annulus from the position 80 into position 82, and from position 75 into position 77 of Fig. 3 is represented in diagram VI by curves $l$—$m$ and $n$—$o$, respectively. The line $m$—$n$, represents the time during which the chuck-carrying frame 301 is in close proximity to the annulus forming device and the conveying disc 81. It will be noted by comparing diagrams IV, V and VI, that the gripping period of one chuck and the gripping period of the other chuck occurs while the chuck carrying frame is in close proximity to the annulus forming device and the conveying disc 81.

Diagram VII consists of rising lobe $p$—$q$ and of descending lobe $q$—$r$, the former as well as the latter illustrating acceleration of the chuck-carrying frame 301 during its 180 degrees revolution when transferring an annulus from position 80 into the position 85. Point $q$ corresponds with the position of the Geneva gear and its driver as shown in Fig. 39, in which position the Geneva gear attains a maximum speed. Comparison between VI and VII shows that the 180 degrees rotary movement of the chucks-carrying frame takes place when the same is in bodily retracted position.

Diagram VIII comprises a rising lobe $s$—$t$ and a descending lobe $t$—$u$, the former representing acceleration, the latter deceleration of the conveying disc during its one quarter revolution. The conveying disc is in a state of rest during 270 degrees revolution of shaft 150 as can be readily understood from the diagram. The various operations performed while the annulus is supported by the conveying disc take place during rest intervals of the latter.

Thus the movement of each of the two ring assembling plungers at station A is shown by the line $v$—$w$—$x$—$y$ in diagram IX, and comparison between VIII and IX shows that such movement takes place while the conveying disc is stationary. Line $v$—$w$ represents actual movement of the said plungers and also of the rings to be assembled. Line $w$—$x$ represents the time during which the plunger 413 and 422 exert pressure upon the rings which are now assembled with the annulus of segments and line $x$—$y$ finally represents withdrawal of these plungers from the assembled rings.

A core 65 is inserted into the assembly of segments and rings, at station B. The line $a1$—$b1$ in diagram X represents the movement of a plunger 451 and of a core 65, moved thereby, until the latter reaches a proper position within the assembly; line $b1$—$c1$ represents the time during which the plunger 451 exerts pressure upon said core and line $c1$—$d1$ represents the time for withdrawal of said plunger.

Cooperating with the plunger 451 is another plunger 481 for yieldingly maintaining the assembly within the conveying disc 81. Line $c1$—$f1$ of diagram XI represents approaching movement of the plunger 481 toward the assembly, line $f1$—$g1$ thereof represents the time during which said plunger exerts pressure upon the assembly in the conveying disc 81, and line $g1$—$h1$ finally represents withdrawal of said plunger 481.

The line for staking each core end to the rings of the assembly is represented by diagrams XII and XIII, lines $i1$—$k1$ and $z1$—$m1$, respectively. It can be readily understood that the staking operation is finished with the end of the plunger advancing movements as represented in X and XI.

Diagram XIV represents the movements of the ejector 500. Line $n1$—$o1$ represents approaching movement of said ejector, line $o1$—$p1$ a rest interval of said ejector in ejecting position and line $p1$—$q1$ withdrawal of said ejector.

It will be noticed by making comparison between IX, X, XI and XIV that all of the fluid pressure operated plungers simultaneously start to advance toward the assembly in the conveying disc and also simultaneously start to withdraw from the assembly due to the one common fluid control device.

Briefly, during a cycle of operation of the machine, occurs the continuous assembling of orderly arranged groups of work pieces, each group consisting of a wedge shaped segment, a riser-bar segment, a mica segment, and a riser bar segment. A chain conveyor moves automatically a predetermined number of groups of work pieces into an annulus forming device. The annulus of work pieces formed in said device is gripped by a chuck which then moves the annulus of work pieces longitudinally out of the annulus forming device, rotatively moves the annulus adjacent a work holder in a disc conveyor and then longitudinally moves the annulus into the work holder which resiliently grips the annulus. Then the chuck releases the annulus. The disc conveyor then moves the annulus intermittently into three stations at which the operations of assembling, clamping and insulating V-rings, assembling and staking a center core, and ejecting the assembled commutator are respectively performed.

While the form of embodiment of the present invention as herein disclosed, constitutes a preferred form, it is to be understood that other forms might be adopted, all coming within the scope of the claims which follow.

What is claimed is as follows:

1. A commutator assembling machine comprising in combination, a magazine for holding flat pieces flat-side down, a chute for delivering wedge-shaped pieces endwise but flat-side down, means for removing the pieces from the magazine and chute to provide a group, and means for forming an annulus of a predetermined number of groups of said pieces.

2. A machine for assembling a commutator comprising, in combination, a device for forming an annulus of orderly arranged segments, a work-holder for receiving the annulus and located out of axial alignment with the annulus forming device, and means for transferring the annulus of segments from said device to said work-holder.

3. A machine for assembling a commutator comprising, in combination, a device for forming an annulus of orderly arranged segments, a work-holder for receiving the annulus and located out of axial alignment with the annulus forming device, and means for moving the annulus of segments axially out from said device, then for moving the annulus laterally into alignment with the work-holder, and then for moving the annulus axially in the opposite direction to place the annulus within the work-holder.

4. A machine for assembling a commutator comprising, in combination, a device for forming an annulus of orderly arranged segments, a work-holder for receiving the annulus, a chuck for transferring the annulus from the device to the work-holder, said chuck having movable members for gripping the annulus, means for causing said members to grip the annulus, means for moving the chuck to withdraw the annulus from said device and to place the annulus within said work-holder, and means for retracting the gripping members of said chuck.

5. A machine for assembling a commutator comprising, in combination, a device for forming an annulus of orderly arranged segments, a work-holder for receiving the annulus and located out of axial alignment with the annulus forming device, a chuck for transferring the annulus from the device to the work-holder, said chuck having movable members for gripping the annulus, means for causing said members to grip the annulus, means for moving the chuck axially to remove the annulus of segments from the annulus forming device, then for moving the chuck laterally into alignment with the work-holder, and then for moving the annulus axially in the opposite direction to place the annulus within the work-holder, and means for retracting the gripping members of said chuck.

6. A machine for assembling a commutator comprising, in combination, a device for forming an annulus of orderly arranged segments, a work-holder for receiving the annulus and located out of axial alignment with the annulus forming device, a chuck for transferring the annulus of segments from said device to the work-holder, said chuck having radially movable gripping fingers, means for moving the fingers radially and including a cam plate rotatable axially of the chuck, means for moving the chuck axially to remove the annulus of segments from the annulus forming device, then for moving the chuck laterally into alignment with the work-holder, and then for moving the annulus axially in the opposite direction to place the annulus within the work-holder, means for rotating the cam plate in a direction to cause the chuck fingers to grip the work while the chuck is adjacent the annulus forming device, and means for rotating the cam plate in the opposite direction to cause the chuck fingers to be retracted from the work when the chuck is adjacent the work-holder.

7. A machine for assembling a commutator comprising, in combination, a device for forming an annulus of orderly arranged segments, a work-holder for receiving the annulus and located out of axial alignment with the annulus forming device, a chuck for transferring the annulus of segments from said device to the work-holder, said chuck having radially movable gripping fingers, means for moving the fingers radially and including a cam plate rotatable axially of the chuck, means for moving the chuck axially to remove the annulus of segments from the annulus forming device, then for moving the chuck laterally into alignment with the work-holder, and then for moving the annulus axially in the opposite direction to place the annulus within the work-holder, a gear carried by the chuck and rotatably connected with the cam plate, a second gear engageable with the plate gear when the chuck is adjacent the annulus forming device, a third gear constantly meshing with the second gear and engageable with the plate gear when the chuck is adjacent the work-holder, and means for turning the second gear in one direction for causing the chuck fingers respectively to grip and release the annulus.

8. A machine for assembling a commutator comprising, in combination, a device for forming an annulus of orderly arranged segments, a work-holder for receiving the annulus and located out of axial alignment with the annulus forming device, means for transferring the annulus from said device to said work-holder and comprising a pair of chucks having movable fingers for engaging the annulus, one of said chucks being located adjacent the annulus forming device while the other chuck is located adjacent the work-holder, means for moving the chucks simultaneously axially in either direction, means for reversing the positions of the chucks, and means for causing the fingers of the chuck adjacent the annulus forming device to grip the annulus while causing the fingers of the chuck adjacent the work-holder to release the annulus.

9. A machine for assembling a commutator comprising, in combination, a device for forming an annulus of orderly arranged segments, a work-holder for receiving the annulus and located out of axial alignment with the annulus forming device, means for transferring the annulus from said device to said work holder and comprising a pair of chucks having movable fingers for engaging the annulus, one of said chucks being located adjacent the annulus forming device while the other chuck is located adjacent the work-holder, an axially movable and rotatable shaft the axis of which is located between the annulus forming device and the work-holder, a chuck frame attached centrally to the shaft and having oppositely extending arms each carrying a chuck, means for moving the shaft axially in either direction, means for intermittently rotating the shaft 180 degrees, and means for causing the fingers of the chuck adjacent the annulus forming device to grip the annulus while causing the fingers of the chuck adjacent the work-holder to release the annulus.

10. A machine for assembling a commutator comprising, in combination, a device for forming an annulus of orderly arranged segments, a work-holder for receiving the annulus and located out of axial alignment with the annulus forming device, means for transferring the annulus from said device to said work holder and comprising a pair of chucks having movable fingers for engaging the annulus, one of said chucks being located adjacent the annulus forming device while the other chuck is located adjacent the work-holder, an axially movable and rotatable shaft the axis of which is located between the annulus forming device and the work holder, a chuck frame attached centrally to the shaft and having oppositely extending arms each carrying a chuck, means for moving the shaft axially in either direction, means for intermittently rotating the shaft 180 degrees, a gear carried by each chuck and rotatable axially thereof, means operated by each gear for moving the chuck fingers into or out of engagement with the annulus, pinions respectively axially engaged by said chuck gears when the chuck frame is moved toward said device and workholder, and means for rotating the pinions respectively in directions to cause the chuck fingers adjacent said device to grip the work and the chuck fingers adjacent the work-holder to release the work.

11. A machine for assembling a commutator comprising, in combination, a device for forming an annulus of orderly arranged segments, a work holder for receiving the annulus and located out of axial alignment with the annulus forming device, means for transferring the annulus from said device to said work-holder and comprising a pair of chucks having movable fingers for engaging the annulus, one of said chucks being located adjacent the annulus forming device while the other chuck is located adjacent the work-holder, means for moving the chucks simultaneously axially in either direction, means for reversing the position of the chucks, a gear carried by each chuck and rotatable axially thereof, means operated by each gear for moving the chuck fingers into or out of engagement with the annulus, pinions respectively axially engaged by said chuck gears when the chuck frame is moved toward said device and work-holder, and means for rotating the pinions respectively in directions to cause the chuck fingers adjacent said device to grip the work, and the chuck fingers adjacent the work holder to release the work.

12. A machine for assembling a commutator comprising, in combination, a device for forming an annulus of orderly arranged segments, a work-holder for receiving the annulus and located out of axial alignment with the annulus forming device, means for transferring the annulus from said device to said work-holder and comprising a pair of chucks having movable fingers for engaging the annulus, one of said chucks being located adjacent the annulus forming device while the other chuck is located adjacent the work holder, an axially movable and rotatable shaft the axis of which is located between the annulus forming device and the work-holder, a chuck frame attached centrally to the shaft and having oppositely extending arms each carrying a chuck, means for moving the shaft axially in either direction, means for intermittently rotating the shaft 180 degrees, a gear carried by each chuck and rotatable axially thereof, means operated by each gear for moving the chuck fingers into or out of engagement with the annulus, pinions respectively axially engaged by said chuck gears when the chuck frame is moved toward said device and work-holder, said pinions being constantly in mesh so that they will rotate in opposite directions, and means for intermittently driving one of said pinions whereby the pinion driving the gear of the chuck adjacent the annulus forming device will cause the fingers of that chuck to grip the annulus and whereby the pinion driving the gear of the chuck adjacent the work-holder will cause the fingers of the chuck to release the annulus.

13. A machine for assembling a commutator comprising, in combination, a device for forming an annulus of orderly arranged segments, a work-holder for receiving the annulus and located out of axial alignment with the annulus forming device, means for transferring the annulus from said device to said work-holder and comprising a pair of chucks having movable fingers for engaging the annulus, one of said chucks being located adjacent the annulus forming device while the other chuck is located adjacent the work-holder, an axially movable and rotatable shaft the axis of which is located between the annulus forming device and the work-holder, a chuck frame attached centrally to the shaft and having oppositely extending arms each carrying a chuck, means for moving the shaft axially in either direction, means for intermittently rotating the shaft 180 degrees, a gear carried by each chuck and rotatable axially thereof, means operated by each gear for moving the chuck fingers into or out of engagement with the annulus, pinions respectively axially engaged by said chuck gears when the chuck frame is moved toward said device and work-holder, said pinions being constantly in mesh so that they will rotate in opposite directions, means for intermittently driving one of said pinions whereby the pinion driving the gear of the chuck adjacent the annulus forming device will cause the fingers of that chuck to grip the annulus and whereby the pinion driving the gear of the chuck adjacent the work holders will cause the fingers of that chuck to release the annulus, a main drive shaft, intermittent gearing directly connecting the main shaft with the chuck frame shaft to rotate the latter 180 degrees, intermittent gearing directly connecting the main shaft with the driving pinion, and a cam driven by said main shaft and included in the means for moving the chuck frame shaft axially.

14. A machine for assembling commutators comprising, in combination, a mechanism for assembling an annulus of orderly arranged segments, a conveyor having a plurality of annulus holders, a chuck for gripping an annulus, means for bodily moving the chuck to transfer an annulus from said mechanism to an annulus holder of said conveyor, means for assembling clamping rings with the annulus, means for assembling a tubular core with the annulus, means for staking the edges of the core against the clamping rings, means for ejecting the assembled commutator from the conveyor, and means for intermittently moving the conveyor.

15. A machine for assembling commutators comprising, in combination, a mechanism for assembling an annulus of orderly arranged segments, a disc conveyor rotatable on an axis parallel to the axis of the annulus as assembled by said mechanism and having a plurality of annulus holders whose axes are parallel to the axis of the annulus, a chuck for gripping an annulus, means for moving the chuck axially with respect to the annulus to withdraw the annulus from said mechanism while the chuck is adjacent said mechanism and to insert the annulus in a work-holder of the conveyor when the chuck is adjacent the conveyor, means for laterally moving the chuck said means operating between the axial movements thereof to transfer the chuck from said mechanism to the conveyor, means for causing the chuck to grip or release the annulus, means for assembling clamping rings with the annulus, means for assembling a tubular core with the annulus, means for staking the edges of the core against the clamping rings, means for ejecting the assembled commutator from the conveyor, and means for intermittently moving the conveyor.

16. A machine for assembling commutators comprising, in combination, a mechanism for assembling an annulus of orderly arranged segments, a disc conveyor rotatable on an axis parallel to the axis of the annulus as assembled by said mechanism and having a plurality of annulus holders whose axes are parallel to the axis of the annulus, a chuck for gripping an annulus, means for supporting the chuck and comprising a frame carried by a shaft parallel to the conveyor axis and located between the conveyor and annulus forming mechanism, means for moving the shaft axially to withdraw the annulus from said mechanism while the chuck is adjacent said mechanism and to insert the annulus in a work-holder of the conveyor when the chuck is adjacent the conveyor, means for turning the shaft to move the chuck laterally, said turning means operating between axial movements of said shaft to transfer the annulus from said mechanism to said conveyor, means for causing the chuck to grip or release the annulus, means for assembling clamping rings with the annulus, means for assembling a tubular core with the annulus, means for staking the edges of the core against the clamping rings, means for ejecting the assembled commutator from the conveyor, and means for intermittently moving the conveyor.

17. A machine for assembling commutators comprising, in combination, a mechanism for assembling an annulus of orderly arranged segments, a disc conveyor rotatable on an axis parallel to the axis of the annulus as assembled by said mechanism and having a plurality of annulus holders whose axes are parallel to the axis of the annulus, a chuck for gripping an annulus, means for supporting the chuck and comprising a frame carried by a shaft parallel to the conveyor axis and located between the conveyor and annulus forming mechanism, a main operating shaft, intermittent gearing directly connecting the main shaft and disc conveyor to rotate the conveyor intermittently, means for moving the shaft axially to withdraw the annulus from said mechanism while the chuck is adjacent said mechanism and to insert the annulus in a work-holder of the conveyor when the chuck is adjacent the conveyor, said means including a cam driven by the main shaft and located coaxially thereof and a member operated by said cam for shifting the chuck frame shaft, intermittent gearing directly connecting the main shaft and chuck frame shaft to move the latter intermittently between axial movements of said shaft, to transfer the annulus from said mechanism to said conveyor, means for causing the chuck to grip or release the annulus, means for assembling clamping rings with the annulus, means for assembling a tubular core with the annulus, means for staking the edges of the core against the clamping rings, means for ejecting the assembled commutator from the conveyor.

18. A machine for assembling commutators comprising, in combination, a mechanism for assembling an annulus of orderly arranged segments, a disc conveyor rotatable on an axis parallel to the axis of the annulus as assembled by said mechanism and having a plurality of annulus holders whose axes are parallel to the axis of the annulus, a chuck for gripping an annulus, means for supporting the chuck and comprising a frame carried by a shaft parallel to the conveyor axis and located between the conveyor and annulus forming mechanism, a main operating shaft, intermittent gearing directly connecting the main shaft and disc conveyor to rotate the conveyor intermittently, means for moving the shaft axially to withdraw the annulus from said mechanism while the chuck is adjacent said mechanism and to insert the annulus in a work-holder of the conveyor when the chuck is adjacent the conveyor, said means including a cam driven by the main shaft and located coaxially thereof and a member operated by said cam for shifting the chuck frame shaft, intermittent gearing directly connecting the main shaft and chuck frame shaft to move the latter intermittently between axial movements of said shaft, to transfer the annulus from said mechanism to said conveyor, annulus gripping members carried by said chuck, means for operating the members and including a cam plate rotatable axially with respect to the chuck, a coaxial gear carried by the cam plate, pinions respectively, engaged by said chuck gear when the chuck is adjacent the annulus forming mechanism or is adjacent the conveyor, a shaft parallel to the main shaft for operating the pinions, intermittently gearing directly connecting the main shaft and pinion operating shaft, means for assembling the clamping rings with the annulus, means for assembling a tubular core with the annulus, means for staking the edges of the core against the clamping rings, and means for ejecting the assembled commutator from the conveyor.

19. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; an inclined track for receiving the orderly segments with their flat sides adjacent each other; means for transferring a group of orderly arranged segments into the track; an annulus forming device adapted to receive groups of segments from the track; and means for moving into the annulus forming device a certain number of segments, said segments being all the segments in the track at the time said movement starts.

20. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; an inclined track for receiving the orderly arranged segments with their flat sides adjacent each other; means for transferring a group of orderly arranged segments into the track; an annulus forming device adapted to receive groups of segments from the track; and linearly moving means for moving into the annulus forming device a certain number of segments, said segments being all the segments in the track at the time said movement starts.

21. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; an inclined track for receiving the orderly arranged segments with their flat sides adjacent each other; means for transferring a group of orderly arranged segments into the track; an annulus forming device adapted to receive groups of segments from the track; and means moved in response to a predetermined number of operations of the group transferring means for simultaneously moving a certain number of segments in the track into the annular forming device, said segments being all the segments in the track at the time said movement starts.

22. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; an inclined track for receiving the orderly arranged segments with their flat sides adjacent each other; means for transferring a group of orderly arranged segments into the track; an annulus forming device adapted to receive groups of segments from the track; and means linearly moved in response to a predetermined number of operations of the group transferring means for simultaneously moving a certain number of segments in the track into the annular forming device, said segments being all the segments in the track at the time said movement starts.

23. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane, means for stacking each group of orderly arranged segments; an inclined track for receiving the orderly arranged stacked segments erect with respect to the supporting track surface; means for moving each group of stacked segments into the track; means for maintaining the segments in the track erect; an annulus forming device adapted to receive groups of segments from the track; linearly moving means for moving a certain number of segments in the track into the annulus forming device said segments being all the segments in the track at the time said movement starts.

24. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; means for stacking each group of orderly arranged segments; a track for receiving the stacked groups of segments erect with respect to the supporting track surface, said track being inclined and terminating into a curved portion adjacent the stacked segments; reciprocatory means for moving each group of stacked segments into the curved portion of the track thereby also moving previously deposited segments in the track; means for reciprocating the last said means; means for maintaining the segments in the track erect; an annulus forming device adapted to receive segments from the track; and means moving parallel to the inclined portion of the track for moving a certain number of segments in the track into the annulus forming device, said segments being all the segments in the track at the time said movement starts.

25. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; means for stacking each group of orderly arranged segments; a track for receiving the stacked groups of segments erect with respect to the supporting track surface, said track being inclined and terminating into a curved portion adjacent the stacked segments; reciprocatory means for moving each group of stacked segments into the curved portion of the track, thereby also moving previously deposited segments in the track means for reciprocating the last said means; means for maintaining the segments in the track erect; an annulus forming device adapted to receive segments from the track; and means moving parallel to the inclined portion of the track in response to a predetermined number of reciprocations of the reciprocatory means for moving a certain number of segments in the track into the annulus forming device, said segments being all the segments in the track at the time said movement starts.

26. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; means for stacking each group of orderly arranged segments; a track for receiving the stacked groups of segments erect with respect to the supporting track surface, said track being inclined and terminating into a curved portion adjacent the stacked segments; reciprocatory means for moving each group of stacked segments into the curved portion of the track thereby also moving previously deposited segments in the track; means for reciprocating the last said means; means for maintaining the segments in the track erect; an annulus forming device adapted to receive segments from the track; a conveyor for moving a certain number of segments in the track into the annulus forming device, said segments being all the segments in the track at the time said movement starts, said conveyor comprising an endless chain carrying a lug for engaging the last segment of the last deposited group of segments in the track and means for moving the endless chain.

27. A machine for assembling a commutator having flat riser bar segments and a wedge shaped segment between each pair of riser bar segments comprising, in combination, devices for delivering the various segments including riser bar segments; means for arranging the segments into groups of orderly recurrent sequence, said segments having their flat sides in a substantially horizontal plane; means for stacking each group of orderly arranged segments; a track for receiving the stacked groups of segments erect with respect to the supporting track surface, said track being inclined and terminating into a curved portion adjacent the stacked segments; reciprocatory means for moving each group of stacked segments into the curved portion of the track thereby also moving previously deposited segments in the track; means for reciprocating the last said means; means for maintaining the segments in the track erect; an annulus forming device adapted to receive segments from the track; and a conveyor for moving segments in the track into the annulus forming device, said segments being all the segments in the track at the time said movement starts, said conveyor comprising an endless chain carrying a lug, the chain being so moved in response to operation of the reciprocatory means that after a predetermined number of operations of the reciprocatory means the lug engages the last segment of the last deposited group of segments in the track.

28. A commutator assembling machine comprising, in combination, a magazine for holding flat pieces flat side down; a chute for delivering wedge shaped pieces endwise but flat side down; reciprocating means for simultaneously removing the lowermost pieces from the magazine and chute to provide a group; and means for forming an annulus of a predetermined number of groups of said pieces.

29. A commutator assembling machine comprising, in combination, a magazine for holding flat pieces, flat side down; a chute for delivering wedge shaped pieces endwise but flat side down, said chute having an opening through which the lowermost piece in the chute may descend; a track for receiving the previous lowermost piece in the chute with its flat side resting on the track, said track being so located with respect to said opening that the piece on the track has left said opening but not the overlying lowermost piece in the chute; yielding means for urging the lowermost piece in the chute upon the track; and reciprocating means for simultaneously removing the lowermost pieces from the magazine and the piece on the track from adjacent the chute opening to provide a group; and means for forming an annulus of a predetermined number of groups of said pieces.

30. A machine for assembling a commutator comprising, in combination, a device for forming an annulus of orderly arranged segments; a workholder for receiving the annulus and located out of axial alignment with the annulus forming device; and means for moving the annulus of segments axially out from said device, then for moving the annulus through a semicircular path into alignment with the workholder, and then for moving the annulus axially to place the annulus within the workholder.

31. A machine for assembling a commutator comprising in combination, a device for forming an annulus of orderly arranged segments, a work-holder for receiving the annulus and located out of axial alignment with the annulus forming device, a chuck for transferring the annulus of segments from said device to the work-holder, said chuck having radially movable gripping fingers, means for moving the fingers radially and including a cam plate rotatable axially of the chuck, means for moving the chuck axially to remove the annulus of segments from the annulus forming device, then for moving the chuck laterally into alignment with the workholder, and then for moving the annulus axially in the opposite direction to place the annulus within the work-holder, a gear carried by the chuck and rotatably connected with the cam plate, a second gear engageable with the plate gear when the chuck is adjacent the annulus forming device, a third gear engageable with the cam plate gear when the chuck is adjacent the workholder; means for turning the second gear in a certain direction when engaged with the cam plate gear; and means for turning the third gear in the opposite direction when engaged with the cam plate gear.

32. A machine for assembling a commutator comprising, in combination, a device for forming an annulus of orderly arranged segments, a work-holder for receiving the annulus and located out of axial alignment with the annulus forming device, means for moving the annulus of segments axially out from said device, then for moving the annulus laterally into alignment with the work-holder, and then for moving the annulus axially in the opposite direction to place the annulus within the work-holder and auxiliary means for guiding the last said means so as properly to guide the annulus into the workholder.

33. A machine for assembling a commutator comprising, in combination, a device for forming an annulus of orderly arranged segments; a workholder for receiving the annulus and located out of axial alignment with the annulus forming device; chucks for transferring the annulus from the device to the workholder, said chucks having movable members for gripping the annulus; an axially movable and rotatable shaft the axis of which is located between the annulus forming device and the workholder; a chuck frame attached centrally to the shaft and having oppositely extending arms each carrying a chuck; means for moving the shaft axially in either direction; means for intermittently rotating the shaft 180 degrees; means for causing the chuck members to grip the annulus in the device or to release the annulus in the workholder; and auxiliary means for guiding the chuck frame while moving axially with the shaft so as axially to align the chucks with the device and the workholder, respectively.

34. A machine for assembling a commutator comprising, in combination, a device for forming an annulus of orderly arranged segments; a workholder for receiving the annulus and located out of axial alignment with the annulus forming device; chucks for transferring the annulus from the device to the workholder, said chucks having movable members for gripping the annulus; an axially movable and rotatable shaft the axis of which is located between the annulus forming device and the workholder; a chuck frame attached centrally to the shaft and having oppositely extending arms each carrying a chuck; means for moving the shaft axially in either direction; Geneva gears for intermittently rotating the shaft 180 degrees, means for rotating the Geneva gears; means for causing the chuck members to grip the annulus in the device or to release the annulus in the workholder; and auxiliary means for guiding the chuck frame while moving axially with the shaft so as axially to align the chucks with the device and the workholder, respectively.

35. A machine for assembling a commutator comprising, in combination, a device for forming an annulus of orderly arranged segments; a workholder for receiving the annulus and located out of axial alignment with the annulus forming device; chucks for transferring the annulus from the device to the workholder, said chucks having movable members for gripping the annulus; an axially movable and rotatable shaft the axis of which is located between the annulus forming device and the workholder; a chuck frame attached centrally to the shaft and having oppositely extending arms each carrying a chuck; means for moving the shaft axially in either direction; means for intermittently rotating the shaft 180 degrees; means for causing the chuck members to grip the annulus in the device or to release the annulus in the workholder; an extending nose carried by the chuck frame, and a stationary block provided with a groove which is adapted to receive said nose and guide the chuck frame while moving axially with the shaft so as axially to align the chucks with the device and the workholder, respectively.

36. A machine for assembling a commutator comprising, in combination, a device for forming an annulus of orderly arranged segments; a workholder for receiving the annulus and located out of axial alignment with the annulus forming device; a chuck for transferring the annulus from the device to the workholder, said chuck having movable members for gripping the annulus; means for causing said members to grip or to release the annulus; means for axially moving the chuck in either direction to withdraw the annulus from said device and to place the annulus within said workholder; and means actuated in response to a predetermined withdrawal of the chuck from said device or the workholder to move the chuck laterally into axial alignment with the workholder or the device, respectively.

37. A machine for assembling a commutator comprising, in combination, a device for forming an annulus of orderly arranged segments; a workholder for receiving the annulus and located out of axial alignment with the annulus forming device; a chuck for transferring the annulus from the device to the workholder, said chuck having movable members for gripping the annulus; means for causing said members to grip or to release the annulus; means actuated in response to a finished operation of the last said means for axially moving the chuck in either direction to withdraw the annulus from said device and to place the annulus within said workholder or to withdraw the chuck from the workholder and move the same toward the device, and means for moving the chuck laterally into alignment with the device or the workholder while withdrawn from the workholder or the device, respectively.

38. A machine for assembling a commutator comprising, in combination, a device for forming an annulus of orderly arranged segments; a workholder for receiving the annulus and located out of axial alignment with the annulus forming device; a chuck for transferring the annulus from the device to the workholder, said chuck having movable members for gripping the annulus; means for causing said members to grip or to release the annulus; means actuated in response to a finished operation of the last said means for axially moving the chuck in either direction to withdraw the annulus from said device and to place the annulus within said workholder or to withdraw the chuck from the workholder and move the same toward the device, and means actuated in response to a predetermined withdrawal of the chuck from said device or the workholder to move the chuck laterally into axial alignment with the workholder or the device, respectively.

In testimony wherof we hereto affix our signatures.

FREDERICK J. HARDMAN.
WALTER SPRUEGEL.